(12) United States Patent
Tukka et al.

(10) Patent No.: US 11,501,781 B2
(45) Date of Patent: Nov. 15, 2022

(54) METHODS AND SYSTEMS FOR PASSIVE WAKEUP OF A USER INTERACTION DEVICE

(71) Applicant: Samsung Electronics Co., Ltd., Suwon-si (KR)

(72) Inventors: Vijaya Kumar Tukka, Bangalore (IN); Deepraj Prabhakar Patkar, Bangalore (IN); Harish Bishnoi, Bangalore (IN); Chethan Konanakere Puttanna, Bangalore (IN); Sulochan Naik, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 16/432,705

(22) Filed: Jun. 5, 2019

(65) Prior Publication Data

US 2019/0371342 A1   Dec. 5, 2019

(30) Foreign Application Priority Data

Jun. 5, 2018 (IN) .............................. 201841021011
Jan. 16, 2019 (IN) .............................. 201841021011

(51) Int. Cl.
*G10L 21/00* (2013.01)
*G10L 25/00* (2013.01)
(Continued)

(52) U.S. Cl.
CPC ............ *G10L 17/22* (2013.01); *G06F 9/4418* (2013.01); *G10L 15/063* (2013.01); *G10L 15/22* (2013.01);
(Continued)

(58) Field of Classification Search
CPC ....... G10L 15/22; G10L 15/063; G10L 17/22; G10L 2015/223; G10L 2015/225;
(Continued)

(56) References Cited

U.S. PATENT DOCUMENTS 6,311,150 B1 * 10/2001 Ramaswamy ........ G06F 40/279
                                                              704/1
7,620,627 B2 * 11/2009 Cava ................... G06F 16/3338
(Continued)

FOREIGN PATENT DOCUMENTS

EP          3035329 A1    6/2016
EP          3001414 B1    9/2017
(Continued)

OTHER PUBLICATIONS

ISA/KR, International Search Report and Written Opinion of the International Searching Authority, International Application No. PCT/KR2019/006834, dated Sep. 10, 2019, 9 pages.
(Continued)

*Primary Examiner* — Michael Ortiz-Sanchez

(57) ABSTRACT

The embodiments herein disclose methods and systems for passive wakeup of a user interaction device and configuring a dynamic wakeup time for a user interaction device, a method includes detecting an occurrence of at least one first non-voice event associated with at least one device present in an Internet of Things (IoT) environment. The method includes detecting an occurrence of at least one successive event associated with the at least one device. The method includes estimating a contextual probability of initiating at least one interaction by a user with the user interaction device on detecting the occurrence of at least one of the at least one first event and the at least one successive event. On determining the estimated contextual probability is above a pre-defined threshold value, the method includes configur-
(Continued)

ing the dynamic wakeup time to switch the user interaction device to a passive wakeup state.

23 Claims, 32 Drawing Sheets

(51) Int. Cl.
| | | |
|---|---|---|
| *G10L 17/22* | (2013.01) | |
| *G06F 9/4401* | (2018.01) | |
| *G10L 15/22* | (2006.01) | |
| *G10L 15/06* | (2013.01) | |
| *H04M 1/724* | (2021.01) | |

(52) U.S. Cl.
CPC ....... *H04M 1/724* (2021.01); *G10L 2015/223* (2013.01); *G10L 2015/225* (2013.01); *H04M 2250/74* (2013.01)

(58) Field of Classification Search
CPC ......... G10L 15/02; G10L 15/30; G10L 15/32; G10L 19/008; G10L 21/0224; G10L 21/0264; G10L 25/09; G10L 25/21; G10L 15/04; G10L 15/083; G10L 15/16; G10L 2015/088; G10L 25/24; G10L 15/1822; G10L 15/183; G10L 2015/0631; G10L 15/05; G10L 15/144; G10L 15/1815; G10L 15/26; G10L 25/87; G10L 25/78; G10L 15/20; G10L 25/84; G10L 15/24; G10L 2025/783; G10L 17/00; G10L 15/25; G10L 17/10; G10L 15/06; G10L 2015/226; G10L 25/00; G06F 3/167; G06F 40/30; G06F 16/36; G06F 40/205; G06F 40/242; G06F 40/274; G06F 40/279; G06F 40/284; G06F 40/35; G06F 16/2425; G06F 16/243; G06F 16/245; G06F 16/24564; G06F 16/285; G06F 16/3322; G06F 16/3338; G06F 16/35; G06F 16/353; G06F 16/635; G06F 16/65; G06F 16/9017; G06F 16/9532; G06F 16/9535; G06F 21/55; G06F 40/216; G06F 40/232; G06F 40/263; G06F 40/40; G06F 40/56; G06F 9/4418; G06F 3/16; G06F 3/017; G06F 2203/0381; G06F 21/32; G06F 3/01; G06F 3/0488; G06F 3/04883; G06F 1/32; G06F 16/3329; G06F 16/90332; G06F 11/3438; G06F 21/31; G06F 40/00; G06F 40/289; H04M 2250/74; H04M 1/724; H04M 1/72454; G06N 20/00

See application file for complete search history.

(56) References Cited

U.S. PATENT DOCUMENTS

| | | | |
|---|---|---|---|
| 8,990,079 B1* | 3/2015 | Newman | G10L 25/93 |
| | | | 704/233 |
| 9,747,899 B2* | 8/2017 | Pogue | G10L 15/22 |
| 10,572,270 B1* | 2/2020 | Sampath | G06F 9/4406 |
| 11,361,756 B2* | 6/2022 | Smith | G10L 15/22 |
| 2007/0239637 A1* | 10/2007 | Paek | G10L 15/22 |
| | | | 706/20 |
| 2015/0286263 A1 | 10/2015 | Heo et al. | |
| 2016/0042748 A1 | 2/2016 | Jain et al. | |
| 2016/0077794 A1 | 3/2016 | Kim et al. | |
| 2016/0232897 A1 | 8/2016 | Pereira et al. | |
| 2016/0240194 A1* | 8/2016 | Lee | G06F 1/3293 |
| 2017/0169817 A1 | 6/2017 | VanBlon et al. | |
| 2017/0242478 A1* | 8/2017 | Ma | G06F 3/011 |
| 2017/0323642 A1 | 11/2017 | Lindahl | |
| 2018/0293974 A1* | 10/2018 | Georges | G10L 15/183 |
| 2019/0027138 A1* | 1/2019 | Wang | G06F 3/167 |
| 2019/0132451 A1* | 5/2019 | Kannan | H04M 3/5235 |
| 2019/0318283 A1* | 10/2019 | Kelly | G06N 20/00 |
| 2019/0348065 A1* | 11/2019 | Talwar | G10L 25/78 |

FOREIGN PATENT DOCUMENTS

| | | |
|---|---|---|
| JP | 2017084177 A | 5/2017 |
| WO | 2014085269 A1 | 6/2014 |
| WO | 2016127042 A1 | 8/2016 |

OTHER PUBLICATIONS

Supplementary European Search Report dated Mar. 22, 2021 in connection with European Application No. 19814475.0, 7 pages.
Examination report dated Oct. 8, 2021, in connection with Indian Application No. 201841021011, 7 pages.

* cited by examiner

METHODS AND SYSTEMS FOR PASSIVE WAKEUP OF A USER INTERACTION DEVICE

CROSS REFERENCE TO RELATED APPLICATION

This application is based on and claims priority to Indian Provisional Application No. 201841021011, filed Jun. 5, 2018, and Indian Application No. 201841021011, filed Jan. 16, 2019, the contents of which are incorporated herein by reference.

BACKGROUND

1. Field

The present disclosure relates to Artificial Intelligent (AI) based user interaction devices and more particularly to auto wakeup of a user interaction device without receiving a trigger word from a user.

2. Description of Related Art

In general, user interaction devices such as Artificial Intelligent (AI) based speakers understand natural language voice commands and accordingly perform tasks for a user. However, the user is required to say a trigger word or a wakeup word to activate and interact with such user interaction devices.

FIGS. 1A and 1B depict example scenarios, wherein a user can interact with a user interaction device 100 using a trigger word. As illustrated in FIG. 1A, the user provides a voice command to activate/wakeup the user interaction device 100 for fetching required information, wherein the voice command may not contain a trigger word. Since the user forgot to say the trigger word, the user interaction device 100 may continue in a sleep state until a reception of the trigger word. Thus, there may be no response from the user interaction device 100 for the voice command provided by the user and the user may have to repeat the entire voice command with the trigger word. In addition, if the user says the trigger word from a far distance or in case of noisy environment, the user interaction device 100 may miss the trigger word and the user may not actually know whether the user interaction device 100 is still listening or not.

Further, a follow-up mode may be proposed in order to avoid the repetition of usage of the trigger word for interacting with the user interaction device 100. As illustrated in FIG. 1B, the user provides the initial voice command with the trigger word for activating the user interaction device 100. After providing the response for the initial voice command, the user interaction device 100 enters into the follow-up mode. In the follow-up mode, the user interaction device 100 continues to be in the active state for a fixed amount of time (e.g. five seconds) by checking whether the user has an additional request. The user may provide further voice commands without including the trigger word during the follow-up mode. However, the wakeup time is always fixed. If the user starts speaking towards the end of the wakeup time without the trigger word, the utterance may be lost and the user may need to repeat the utterance again. Further, the user will always be thinking of the fixed wakeup timeout, which may be even more annoying. In the follow-up mode, the user has to be ready with all the questions for the conversation beforehand; otherwise, it may be difficult for him to think about the next queries within the fixed wakeup time. Further, the follow up time is context-less and is always on.

The principal object of the embodiments herein is to disclose methods and systems for configuring a dynamic wakeup time for a user interaction device without receiving a trigger word from a user.

Another object of the embodiments herein is to disclose methods and systems for estimating a contextual probability of initiating an interaction by the user with the user interaction device.

Another object of the embodiments herein is to disclose methods and systems for configuring the dynamic wakeup time for the user interaction device using the estimated contextual probability.

SUMMARY

Accordingly, the embodiments herein provide methods and systems for passive wake up of a user interaction device by configuring a dynamic wakeup time for the user interaction device. A method disclosed herein includes detecting an occurrence of at least one first event associated with at least one device present in an Internet of Things (IoT) environment, wherein the at least one device is connected to the configuring device and the at least one first event includes at least one non-voice event. The method further includes detecting an occurrence of at least one successive event associated with the at least one device present in the IoT environment. The method further includes estimating a contextual probability of initiating at least one voice interaction by a user with the user interaction device on detecting the occurrence of at least one of the at least one first event and the at least one successive event. Further, the method includes configuring the dynamic wakeup time to switch the user interaction device to a passive wakeup state on determining that the estimated contextual probability is above a pre-defined threshold value and the dynamic wakeup time is configured based on the estimated contextual probability.

Accordingly, the embodiments herein provide a configuring device. The configuring device includes an event detection unit configured to detect an occurrence of at least one first event associated with at least one device present in an Internet of Things (IoT) environment, wherein the at least one device is connected to the configuring device and the at least one first event includes at least one non-voice event. The event detection unit is further configured to detect an occurrence of at least one successive event associated with the at least one device present in the IoT environment. The configuring device further includes a contextual probability estimation unit configured to estimate a contextual probability of initiating at least one voice interaction by a user with the user interaction device on detecting the occurrence of at least one of the at least one first event and the at least one successive event. The configuring device further includes a wakeup time configuring unit configured to configure the dynamic wakeup time to switch the user interaction device to a passive wakeup state on determining that the estimated contextual probability is above a pre-defined threshold value, wherein the dynamic wakeup time is configured based on the estimated contextual probability.

Accordingly, the embodiments herein provide a method of a voice assistant device. Initially, at least one voice input from at least one user is received during wake-up mode of the voice assistance device and intent associated with the at least one voice input is identified. Probability of issuance of a subsequent voice input from the at least one user is determined based on at least one of the intent, historic data and one or more contextual factors. When the probability is greater than a predefined threshold value, extended wake-up duration of the voice assistant device is estimated. Further, duration of the wake-up mode of the voice assistant device is extended for the extended wake-up duration to receive the subsequent voice input from the at least one user.

Accordingly, the embodiments herein provide a voice assistant device comprising a receiver configured to receive at least one voice input from at least one user, when operated in wake-up mode. The voice assistant device further comprises a processor and a memory communicatively coupled to the processor. The memory stores processor-executable instructions, which, on execution, cause the processor to identify intent associated with the at least one voice input by the voice assistant device from the at least one user. Further, the processor is configured to determine probability of issuance of a subsequent voice input from the at least one user based on at least one of the intent, historic data and one or more contextual factors. An extended wake-up duration of the voice assistant device is estimated, when the probability is greater than a predefined threshold value. Further, duration of the wake-up mode is extended for the extended wake-up duration to receive the subsequent voice input from the at least one user.

Accordingly, the embodiments herein provide a method for controlling a voice assistant device. Initially, intent associated with at least one voice input received by the voice assistant device from at least one user, is identified. Probability of issuance of a subsequent voice input from the at least one user is determined based on at least one of the intent, historic data and one or more contextual factors. When the probability is greater than a predefined threshold value, extended wake-up duration of the voice assistant device is estimated. Further, duration of the wake-up mode of the voice assistant device is extended for the extended wake-up duration to receive the subsequent voice input from the at least one user.

Accordingly, the embodiments herein provide a control apparatus for controlling a voice assistant device. The control apparatus is associated with the voice assistant device and comprises a first processor and a first memory communicatively coupled to the first processor. The first memory stores processor-executable instructions, which, on execution, cause the first processor to control the voice assistant device. Initially, intent associated with at least one voice input received by the voice assistant device from at least one user, is identified. Probability of issuance of a subsequent voice input from the at least one user is determined based on at least one of the intent, historic data and one or more contextual factors. When the probability is greater than a predefined threshold value, extended wake-up duration of the voice assistant device is estimated. Further, duration of the wake-up mode of the voice assistant device is extended for the extended wake-up duration to receive the subsequent voice input from the at least one user.

Accordingly, the embodiments herein provide a method for determining probability of issuance of a subsequent voice input to a voice assistant device. Initially, for the determination, one or more keywords is extracted from plurality of words in at least one voice input received by the voice assistant device, based on intent of the voice input. Domain associated with the at least one voice input is identified based on the one or more keywords. Further, domain matching scores are computed for the identified domain with plurality of pre-stored domains associated with the at least one user. The probability of issuance of the subsequent voice input to the voice assistant device is determined based on the domain matching scores, historic data and one or more contextual factors associated with the at least one user.

Accordingly, the embodiments herein provide a probability determine apparatus for determining probability of issuance of a subsequent voice input to a voice assistant device. The probability determine apparatus is associated with the voice assistant device and comprises a second processor and a second memory communicatively coupled to the second processor. The second memory stores processor-executable instructions, which, on execution, cause the second processor to determine the probability of issuance of the subsequent voice input to the voice assistant device. Initially, for the determination, one or more keywords is extracted from plurality of words in at least one voice input received by the voice assistant device, based on intent of the voice input. Domain associated with the at least one voice input is identified based on the one or more keywords. Further, domain matching scores are computed for the identified domain with plurality of pre-stored domains associated with the at least one user. The probability of issuance of the subsequent voice input to the voice assistant device is determined based on the domain matching scores, historic data and one or more contextual factors associated with the at least one user.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF FIGURES

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1A:
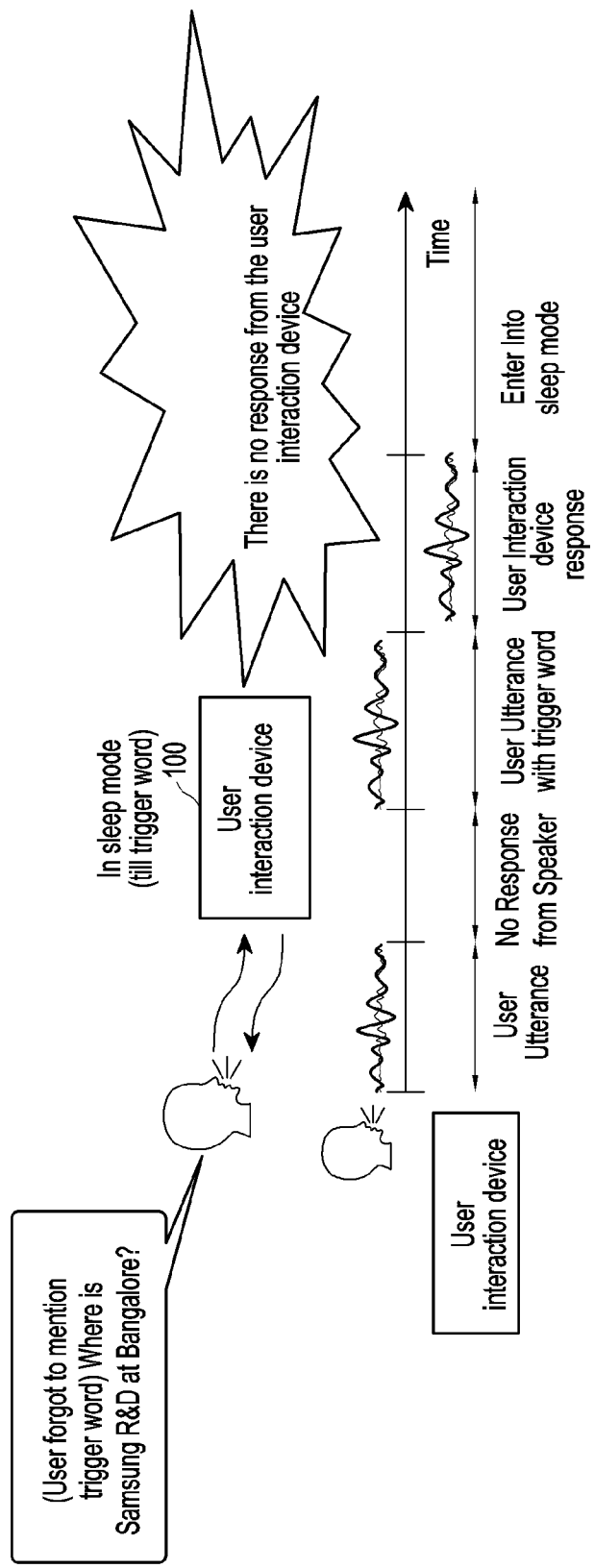
FIGS. 1A and 1B depict example scenarios, wherein a user can be interacted with a user interaction device using a trigger word.
Figure 1B:
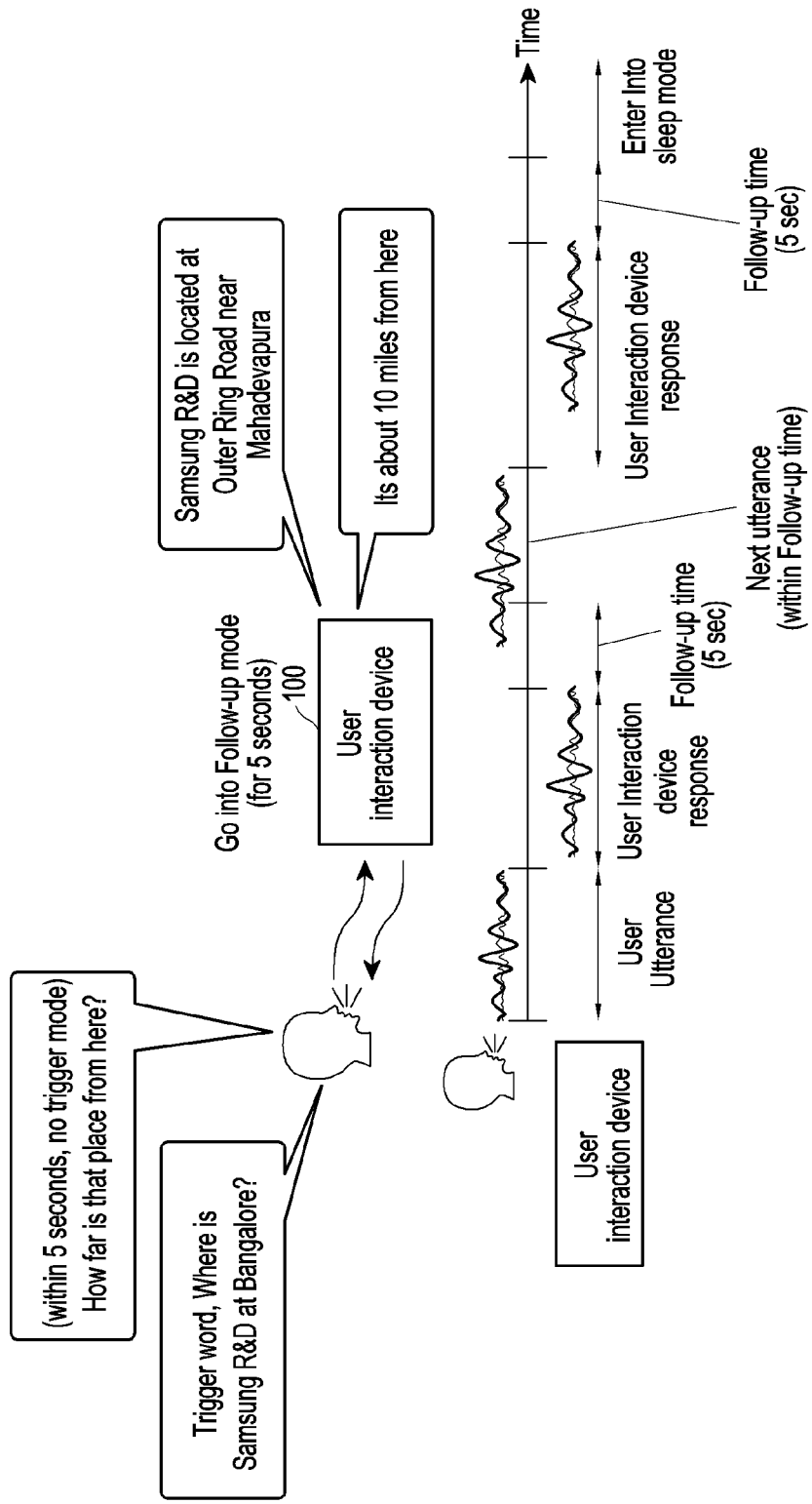

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein disclose methods and systems for passive wakeup of a user interaction device and for configuring a dynamic wakeup time for a user interaction device based on a contextual probability. Referring now to the drawings, and more particularly to FIGS. 2 through 16D, where similar reference characters denote corresponding features consistently throughout the figures, there are shown example embodiments.

Present disclosure proposes method and apparatus to control a voice assistant device, for providing best user experience. When a voice input is received from at least one user, the voice assistant device is configured to check on probability of issuance of subsequent voice input. If the probability is greater than a predefined threshold value, wake-up time of the voice assistant device is extended. The present disclosure also proposes to determine extended wake-up duration of the voice assistant device, based on the probability. The wake-up duration is dynamically determined based on context of the voice inputs, the probability and various other factors related to the at least one user.

Figure 2A:
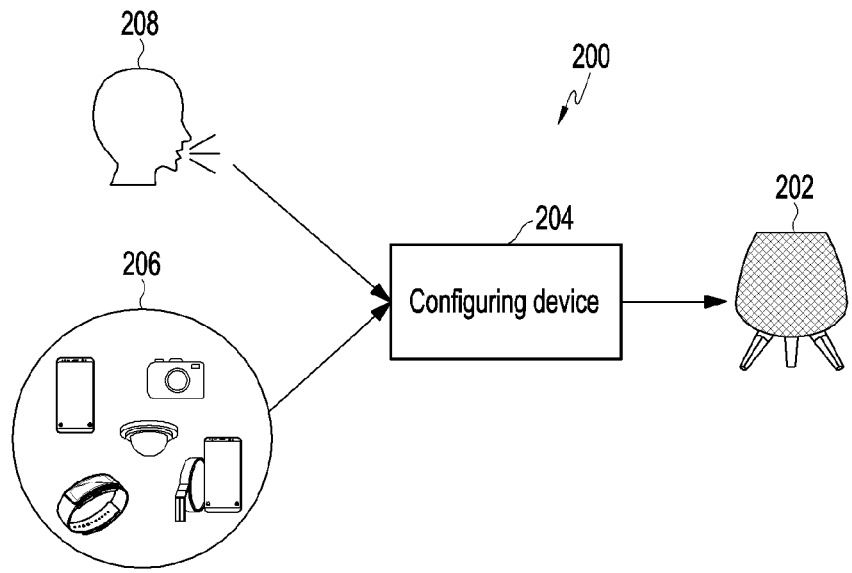
FIGS. 2A-2D illustrate a system for configuring a dynamic wake-up time to activate a user interaction device, according to embodiments as disclosed herein.

FIGS. 2A-2D illustrate a system 200 for configuring a dynamic wakeup time to activate a user interaction device 202, according to embodiments as disclosed herein. As illustrated in FIG. 2A, the system 200 includes the user interaction device 202, a configuring device 204 and a plurality of devices 206. The plurality of devices 206 may be present in an Internet of Thing (IoT) environment.

The user interaction device 202 can be a device that enables user(s) 208 to interact with the device using uttered phrases/queries/statements/commands. Embodiments herein may use the terms 'user interaction device', 'smart speaker', 'Artificial Intelligence (AI) based speaker', 'voice assistant device', 'chatbot' and so on to refer to a device with which the user 208 can interact using uttered phrases/queries/statements/commands. It should be noted that the embodiments disclosed herein may use any type of user interaction device without otherwise deterring the intended function of interacting with the user based on uttered phrases/queries/statements/commands received from the user as can be deduced from this description and corresponding drawings. Further, the user interaction device 202 can be a stand-alone device or can be integrated with another device such as, but not limited to, a computer, a laptop, a smart phone, a phone, an IoT device, a wearable device, a vehicle infotainment system, a Television (TV), a camera and so on. The user interaction device 202 may also have access to databases (not shown) for fetching information for queries received from the user. In addition, the user interaction device 202 may further connect to at least one of a cloud, a dedicated user interaction device cloud, a server and so on using at least one communication network for accessing information for the queries received from the user. Examples of the communication network can be, but not limited to, the Internet, a wired network (a Local Area Network (LAN), Ethernet and so on), a wireless network (a Wi-Fi network, a cellular network, a Wi-Fi Hotspot, Bluetooth, Zigbee and so on) and so on.

Figure 2B:
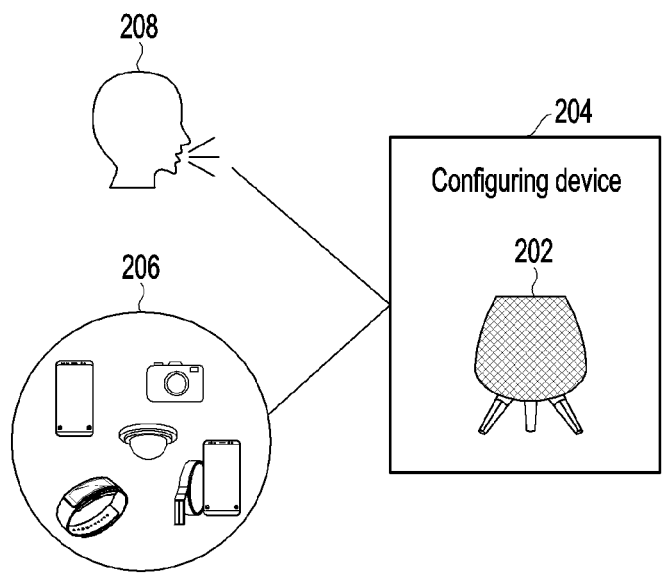
Figure 2C:
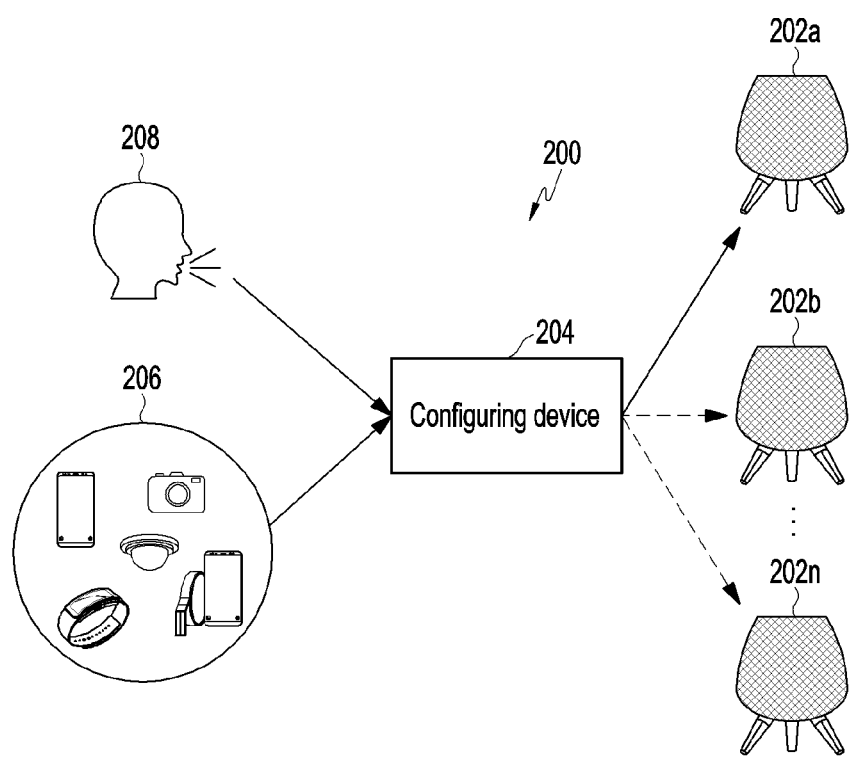
Figure 2D:
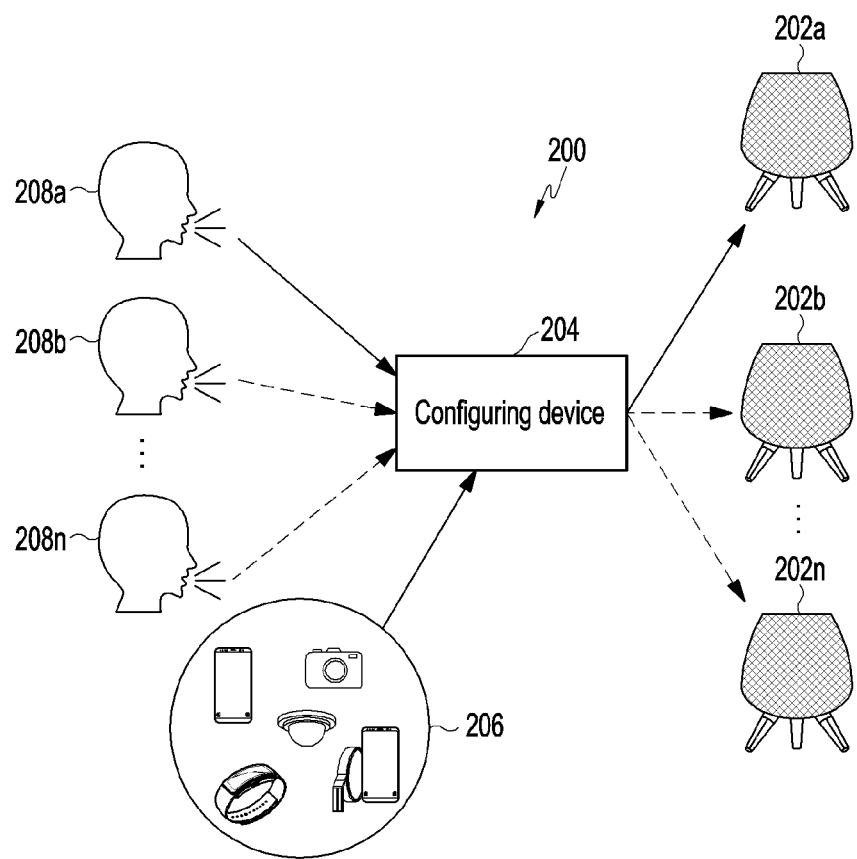

In an embodiment, the system 200 may include a plurality of user interaction devices 202a-202n as illustrated in FIG. 2C. The plurality of user interaction devices 202a-202n can be placed at different locations (a living room, a kitchen, a room and so on). In another embodiment, a plurality of users 208a-208n can be present in the different locations and can interact with the plurality of user interaction devices 202a-202n as illustrated in FIG. 2D.

The configuring device 204 referred herein can be at least one of a dedicated server, the cloud, a hub, a router, a user device (such as a mobile phone, tablet, a computer, a laptop, an IoT device, a wearable device, a camera, and so on), and so on. The configuring device 204 can be connected to the user interaction device 202 through the communication network. The configuring device 204 can also be connected to the devices 206 through the communication network.

The devices 206 may include suitable hardware and software to directly communicate with the configuring device 204 through the communication network. Examples of the devices 206 can be, but not limited to, a mobile phone, a smartphone, tablet, a phablet, a personal digital assistant (PDA), a laptop, a computer, a wearable device, a vehicle infotainment system, a house hold appliance (an oven, a refrigerator, a washing machine or the like), a medical device, a camera, a television (TV), a vehicle display, a vehicle infotainment system, a sensor (a door sensor, a motion sensor, a thermometer, a microphone, a proximity sensor, a contact sensor or the like) and so on.

In an embodiment, the configuring device 204 can be the user interaction device 202 as illustrated in FIG. 2B. The user interaction device 202 (the configuring device 204) may be connected to the devices 206 through the communication network. The user interaction device 202 may perform all the intended functions of the configuring device 204.

In an embodiment, the system 200 may also employ devices such as, but not limited to, a smart phone, a wearable device, a camera, an IoT device, a sensor (a motion sensor, a proximity sensor, a contact sensor and so on) or any other dedicated device or a generic device connected to the configuring device 204 for monitoring activities of the user 208.

In an embodiment, the configuring device 204 can be configured to wakeup/activate the user interaction device 202 in a passive wakeup state based on a contextual probability. In the passive wakeup state, the user interaction device 202 can interact with the user 208 without any trigger word/wakeup word. The configuring device 204 estimates the contextual probability on determining an occurrence of sequence of events associated with the devices 206. The contextual probability can be estimated based on at least one of the activities of the user, user context, user speech properties, status of devices 206, and history of voice interactions and so on. In an embodiment, the configuring device 204 uses various machine learning models/neural network models for estimating the contextual probability. Further, the configuring device 204 compares the contextual probability with a pre-defined threshold value. On determining that the contextual probability exceeds the pre-defined threshold value, the configuring device 204 configures the dynamic wakeup time to switch the user interaction device 202 to the passive wakeup state. The configuring device 204 further sends a wakeup command along with information about the dynamic wakeup time to the user interaction device 202. The wakeup command can be sent as a part of Natural Language Generation (NLG) response. Further, on receiving the wakeup command and the information about the dynamic wakeup time, the user interaction device 202 can be active for the configured wakeup time and listens to the voice commands provided by the user 208. Thus, the user interaction device 202 can be activated and can interact with the user 208 without any trigger word/wakeup word from the user 208.

In another embodiment, the configuring device 204 can be configured to wakeup/activate at least one user interaction device (for example: 202a) of the plurality of user interaction devices 202a-202n present at the different locations. The configuring device 204 estimates the contextual probability of initiating voice interaction by the user 208 with the at least one user interaction (202a). The contextual probability can be estimated based on the detection of the occurrence of sequence of events associated with the devices 206 and location information. The location information can be, but not limited to, a source location of the detected sequence of events, a location of the user 208 determined at a time of occurrence of the sequence of events and so on. Based on the estimated contextual probability, the configuring device 204 configures the dynamic wakeup time for the at least one user interaction device 202a.

In yet other embodiment, the configuring device 204 can be configured to estimate the contextual probability of initiating the voice interaction by at least one user (for example: 208a) of the plurality of users 208a-208n with the at least one user interaction device 202a of the plurality of user interaction devices 202a-202n present at the different locations. The context probability can be estimated based on the detection of the occurrence of sequence of events associated with the devices 206 and the location information. The location information can be, but not limited to, a source location of the detected sequence of events, a location of the plurality of users 208 determined at the time of occurrence of the sequence of events and so on. Based on the estimated contextual probability, the configuring device 204 configures the dynamic wakeup time for the at least one user interaction device 202a.

FIG. 2 shows various units of the system 200, but it is to be understood that other embodiments are not limited thereon. In other embodiments, the system 200 may include less or more number of units. Further, the labels or names of the units are used only for illustrative purpose and does not limit the scope of the embodiments herein. One or more units can be combined together to perform same or substantially similar function in the system 200.

Figure 3:
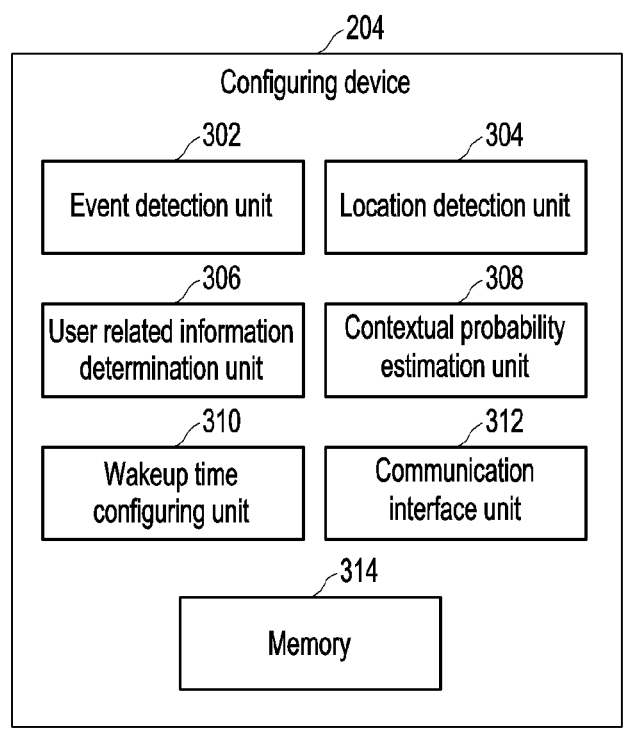
FIG. 3 is a block diagram illustrating various units of a configuring device for configuring a dynamic wakeup time to activate a user interaction device, according to embodiments as disclosed herein.

FIG. 3 is a block diagram illustrating various units of the configuring device 204 for configuring the dynamic wakeup time to activate the user interaction device 202, according to embodiments as disclosed herein. The configuring device 204 (or the user interaction device 202) includes an event detection unit 302, a location detection unit 304, a user related information determination unit 306, a contextual probability estimation unit 308, a wakeup time configuring unit 310, a communication interface unit 312 and a memory 314.

The event detection unit 302 can be configured to detect the occurrence of a first event associated with the at least one device 206. The devices 206 may be connected to the configuring device 204. In an embodiment herein, the first event may be a non-voice event which can be at least one of change in activities of the user, status change of the at least one device 206 present in the IoT environment, a scheduled event, a calendar event, a pre-defined event occurring, and so on. The event detection unit 302 continuously receives and processes information from the devices 206. The information received from the devices 206 may include at least one of status of the devices 206, information about surrounding of the devices 206, activities of the user 208 and so on. The processing of the information involves storing of the information extracted/received from the devices 206 in the memory, forming a pipeline of such events associated with the extracted information and filtering the events based on the user to detect the occurrence of the first event.

The event detection unit 302 compares the processed information with previously received information from the devices 206 to detect at least one of the status change of the at least one device 206 present in the IoT environment and the change in the activities of the user 208. On determining the at least one of the status change of the at least one device 206 and the change in the activities of the user, the event detection unit 302 detects the occurrence of the first event associated with the at least one device 206 present in the IoT environment. The detection of occurrence of the first event helps in determining the possibility of initiating the interaction/conversation by the user 208 with the user interaction device 202. In an example herein, the first event can be, but is not limited to, a door opening event (detected using a contact sensor or a door lock IoT device), a user wakeup from sleep event (detected using a wearable device), a taxi booking event (detected using an application present on a smart phone), and so on.

Further, the event detection unit 302 can be configured to detect a second event/series of events/successive events associated with the at least one device 206 present in the IoT environment (successive events). The successive events can be at least one of a voice event, the change in activities of the user 208 and the status change of the at least one device 206 present in the IoT environment. The event detection unit 302 processes the information received from the IoT devices 206 to detect the occurrence of the successive events. The processing of the information involves storing of the information extracted/received from the devices 206 in the memory, forming the pipeline of such events associated with the extracted information and filtering the events based on the user to detect the occurrence of the successive events. The detection of occurrence of the successive events helps in determining a more probabilistic estimation of initiating the conversation by the user 208 with the user interaction device 202 based on a context. In an example herein, the successive events can be, but is not limited to, a user presence detected event after the door opening event, a user walking event after the user wakeup from the sleep event, a taxi arrival event after the taxi booking event and so on.

The location detection unit 304 can be configured to determine the information about the source location of the detected first event and the successive events, the location of the user 208/plurality of users (208a-208n) at the time of occurrence of the at least one of the first event and the successive events or the like. The location detection unit 304 determines the location information using the at least one of the device (such as a smart phone, a wearable device, a camera, an IoT device, motion sensors and so on) employed by the system 200 for monitoring the activities of the user and the devices 206.

The user related information determination unit 306 can be configured to determine the user related information based on the detection of the occurrence of the at least one of the first event and the successive events. The user related information can be, but not limited to, the location/position of the user at the time of occurrence of the at least one of the first event and the successive events, behavior of the user while the occurrence of the at least one of the first event and the successive events, gestures performed by the user/interaction of the user with other users during the occurrence of the at least one of the first event and the successive events and so on. The user related information can be determined based on data collected from the devices such as a smart phone, a wearable device, a camera, an IoT device, motion sensors and so on) employed by the system 200 for monitoring the activities of the user.

The contextual probability estimation unit 308 can be configured to estimate the contextual probability in response to detection of at least one of the first event and the successive events. The contextual probability indicates the probability of initiating the interaction/conversation by the user 208 with the user interaction device 202. The contextual probability can be estimated using the at least one of the detected first event and the successive events and the context. The contextual probability estimation unit 308 determines the context using context parameters such as, but not limited to, user context, user Personal Language Modeling (PLM) data, device context associated with the devices 206, history of voice interactions and so on. The user context can include information about at least one of activity of the user, location of the user, presence of the user and so on. The user PLM data includes information about at least one of user's schedule (meetings, interested events, conference calls, and so on) and user's voice parameters (tone, pitch, amplitude, frequency and so on) or the like. The contextual probability estimation unit 308 determines the user context and the user PLM data by collecting and analyzing data from at least one of the devices (such as a smart phone, a wearable device, a camera, an IoT device, motion sensors and so on) employed by the system 200 for monitoring the activities of the user and the devices 206. Thus, a user profiling can be performed to determine the user context. The device context can include information about at least one of current status of the devices 206, patterns of events associated with the devices 206 and so on. The contextual probability estimation unit 308 determines the device context by collecting and analyzing information from the devices 206. The contextual probability estimation unit 308 can access external databases (not shown) or memory 314 to obtain the history of voice interactions with the user interaction device 202.

In an embodiment, the contextual probability estimation unit 308 may use any neural network models or AI based models to estimate the contextual probability. For estimating the contextual probability, the contextual probability estimation unit 308 passes the detected first event and the successive events and the determined context to a neural network model. The context includes the history of sequence of events and history of voice command interactions from the user. The neural network model extracts meaningful patterns of sequence of events (occurred just before each voice wakeup from the user) from the history of sequence of events and the history of voice command interactions from the user. In an embodiment, various sequence mining techniques can be used to extract the meaningful patterns of sequences of events. Further, the neural network model performs a correlation of the meaningful patterns of the sequence of events with the voice command interactions from the user (derived from the context). The correlation indicates dependencies between the sequence of the events and the voice command interactions from the user derived from the history. Using this correlation and the first event, successive events with the context, the neural network model can predict a confidence value indicating the likelihood of user initiating the voice interaction with the user interaction device 202. In an embodiment herein, the confidence value indicates the contextual probability of initiating the conversation by the user 208 with the user interaction device 202.

In an embodiment, the contextual probability estimation unit 308 can be configured to estimate the contextual probability based on the detection of the occurrence of the at least one first event and the successive events and the user related information determined at the time of the occurrence of the at least one of the first event and the successive events.

In another embodiment, the contextual probability estimation unit 308 can be configured to estimate the contextual probability of initiating the voice interaction by the user 208 with the at least one user interaction device (202a) of the plurality of user interaction devices 202a-202n. The contextual probability can be estimated based on the location information (the source location of the first event and the successive events and the location of the user) determined by the location detection unit 304.

In yet other embodiments, the contextual probability estimation unit 308 can be configured to estimate the contextual probability of initiating the voice interaction by the at least one user 208a with the at least one user interaction device (202a) of the plurality of user interaction devices 202a-202n. The contextual probability can be estimated based on the source location of the first event and the successive events and the location of the plurality of users 208a-208n determined at the time of occurrence of the at least one of the first event and the successive events.

The wakeup time configuring unit 310 can configure the dynamic wakeup time for switching the user interaction device 202 to the passive wakeup state. In the passive wakeup state, the user interaction device 202 can be awake in the background for the configured dynamic wakeup time and the user need not have initiated a conversation. However, the user 208 may initiate a fresh/new conversation without saying the trigger or wakeup word, when the user interaction device 202 is in the passive wakeup state.

In an embodiment, the wakeup time configuring unit 310 can configure the dynamic wakeup time for the at least one user interaction device 202a based on the estimated contextual probability of initiating the voice interaction by the user(s) 208 with the at least one user interaction device (202a) of the plurality of user interaction devices 202a-202n.

The wakeup time configuring unit 310 configures the dynamic wakeup time based on the estimated contextual probability of initiating the conversation by the user 208 with the user interaction device 202. The wakeup time configuring unit 310 compares the estimated contextual probability with the pre-defined threshold value (the pre-defined probability). The pre-defined threshold value can be static or dynamically determined based on a conversation frequency of the user with the user interaction device 202. In addition, the pre-defined threshold value varies from device to device and user to user. On determining that the estimated contextual probability falls not above the pre-defined threshold value, the wakeup time configuring unit 310 does not estimate the wakeup time. Thus, the user interaction device 202 remains in a sleep state.

On determining that the estimated contextual probability exceeds the pre-defined threshold value, the wakeup time configuring unit 310 decides to activate the user interaction device 202 and a delta wakeup time duration (the dynamic wakeup time) for activating the user interaction device 202 in the passive wakeup state. The wakeup time configuring unit 310 estimates the delta wakeup time duration based on at least one of the estimated contextual probability, the history of voice interactions and so on. The delta wakeup time duration may directly proportional to the contextual probability. Thus, higher the contextual probability more the delta wakeup time duration. The delta wakeup time can be estimated dynamically based on the factors such as, but not limited to, a type of the sequential events received, a user context and so on.

Once the delta wakeup time is estimated, the wakeup time configuring unit 310 provides a passive wakeup command to the user interaction device 202. The passive wakeup command includes information about the estimated delta wakeup time duration for which the user interaction device 202 needs to be in the passive wakeup state/active state. In an embodiment herein, the wakeup time configuring unit 310 may send the passive wakeup command to the user interaction device 202 in a Natural Language Generation (NLG) form. On receiving the passive wakeup command, the user interaction device 202 switches from the sleep state to the passive wakeup state, continues to be awake for the delta wakeup duration, and listens for any commands from the user 208.

In an embodiment, on identifying the voice commands/conversation initiated by the user 208, the user interaction device 202 may enter into a response wakeup state while being awake for the estimated delta wakeup time duration. In the response wakeup state, the user 208 can provide voice commands/queries without saying the trigger word and the user interaction device 202 can interact with the user 208 for the estimated delta wakeup time duration.

In another embodiment, the wakeup time configuring unit 310 extends the delta wakeup time duration for the user interaction device 202. Based on the voice commands/conversation initiated by the user 208 (after switching of the user interaction device 202 to the passive wakeup state), the wakeup time configuring unit 310 determines that the user 208 needs more time to finish the query and extends the delta wakeup time duration. Thus, the user interaction device 202 remains in the wakeup state and the user 208 may complete the query. In an embodiment, the extended delta wakeup time duration can be estimated dynamically based on factors such as, but not limited to, sequential events, user context and so on.

Consider an example scenario, wherein the user 208 wakes up in the morning. The event detection unit 302 determines the user wakeup event as the first event and the user walking activity as the successive event. Based on the detection of the events, the contextual probability estimation unit 308 estimates the contextual probability of initiating the voice interaction by the user 208 with the user interaction device 202 after wakeup. Further, based on the contextual probability, the wakeup time configuring unit 310 activates the user interaction device 202 indicating the passive wakeup time duration for which the user interaction device 202 needs to be awake.

Consider another scenario, wherein the user 208 wakes up in the morning and the plurality of user interactions devices 202a-202n are present at different locations. In an example herein, the user interaction device 202a is located at the living hall and the user interaction device 202b is located at the user's room. The event detection unit 302 determines the user wakeup event as the first event and the user walking activity as the successive event. The location detection unit 304 determines the source location of the detected events and the user location at the time of occurrence of the events. In an example herein, the source location of the detected events and the user location can be determined as the room. The contextual probability estimation unit 308 estimates the contextual probability of initiating the voice interaction by the user 208 with the user interaction device 202b located at the room. The contextual probability can be estimated based on the detection of occurrences of the events and the location information. Further, based on the contextual probability, the wakeup time configuring unit 310 activates the user interaction device 202b indicating the passive wakeup time duration for which the user interaction device 202b needs to be awake.

Consider yet other scenario, wherein the user 208a wakes up in the morning and at the same time, the user 208b enters into a home. Further, the user interaction device 202a is located at the living hall and the user interaction device 202b is located at the user's room. The event detection unit 302 simultaneously detects the occurrences of the events associated with the user 208a and the user 208b. For the user 208a, the event detection unit 302 determines wakeup event as the first event and the walking activity as the successive event. For the user 208b, the event detection unit 302 determines the door unlock event as the first event and the user presence as the successive event. Based on the detection of the occurrence of the events, the location detection unit 304 determines the source location of the events and the location of the user 208a and the user 208b at the time of occurrence of the events. In an example herein, the source location of the events associated with the user 208a and the location of the user 208*a* at the time of occurrences of the events may be the room. Similarly, the source location of the events associated with the user 208*b* and the location of the user 208*b* at the time of occurrences of the events may be the living hall. Based on the detection of the occurrences of the events and the location information associated with the user 208*a*, the contextual probability estimation unit 308 estimates the contextual probability of initiating the voice interaction by the user 208*a* with the user interaction device 202*b* located at the room. Similarly, based on detection of the occurrences of the events and the location information associated with the user 208*b*, the contextual probability estimation unit 308 estimates the contextual probability of initiating the voice interaction by the user 208*b* with the user interaction device 202*a* located at the living hall. Based on the contextual probability, the wakeup time configuring unit 310 activates the user interaction device 202*a* and the user interaction device 202*b* indicating the passive wakeup time duration for which the user interaction devices need to be awake. Thus, the plurality of users 208*a*-208*n* can interact with the plurality of user interaction devices 202*a*-202*n* (located at different locations) at the same time without using the trigger word.

Consider yet other scenario, wherein the user 208 wakes up in the morning. The event detection unit 302 determines the user wakeup event as the first event and the user walking activity as the successive event. Further, the user related information determination unit 306 determines whether the user 208 is talking to another user/the position of the user/the gestures being performed by the user 208 or the like at the time of the occurrence of the events. In an example herein, the user related information determination unit 306 determines the user 208 is talking to another user while walking. Based on the detection of the events and the user related information, the contextual probability estimation unit 308 estimates the contextual probability of initiating the voice interaction by the user 208 with the user interaction device 202 after wakeup. In an example herein, the estimated contextual probability may fall below the pre-defined threshold since the user is talking to another user while walking (the successive event). Thus, the wakeup time configuring unit 310 does not activate the user interaction device 202 and the user interaction device 202 remains to be in the sleep state.

The communication interface unit 312 can establish communication between the configuring device 204 and at least one of the user interaction device 202, the devices 206 and so on through the communication network.

The memory 314 can be configured to store the voice interactions, the wakeup time configurations, the sequence of the events, the user related information and so on. The memory 314 may include one or more computer-readable storage media. The memory 314 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 314 may, in some examples, be considered as a non-transitory storage medium. The term "non-transitory" may indicate that the storage medium is not embodied in a carrier wave or a propagated signal. However, the term "non-transitory" should not be interpreted to mean that the memory 314 is non-movable. In some examples, the memory 314 can be configured to store larger amounts of information than the memory. In certain examples, a non-transitory storage medium may store data that can, over time, change (e.g., in Random Access Memory (RAM) or cache).

FIG. 3 illustrates various units of the configuring device 204 but it is to be understood that other embodiments are not limited thereon. In other embodiments, the configuring device 204 may include less or more number of units. Further, the labels or names of the units are used only for illustrative purpose and does not limit the scope of the embodiments herein. One or more units can be combined together to perform same or substantially similar function in the configuring device 204.

Figure 4:
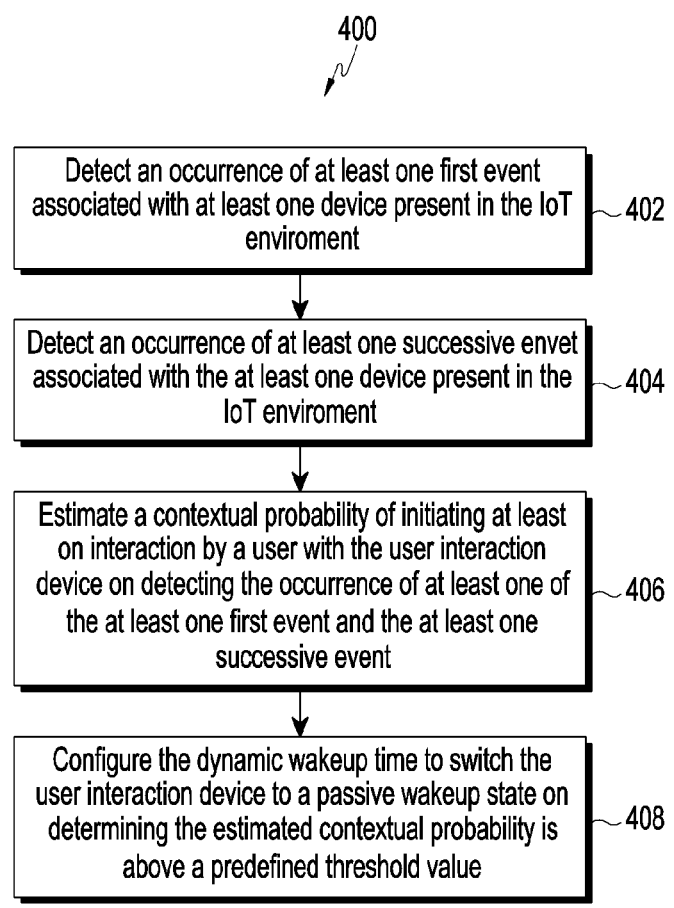
FIG. 4 is a flow diagram illustrating a method for configuring a dynamic wakeup time for a user interaction device, according to embodiments as disclosed herein.

FIG. 4 is a flow diagram 400 illustrating a method for configuring the dynamic wakeup time for the user interaction device 202, according to embodiments as disclosed herein.

At step 402, the method includes detecting, by the configuring device 204, the first event. In an embodiment herein, the first event may be a non-voice event. At step 404, the method includes detecting, by the configuring device 204, the successive events associated with devices 206 (the successive events). The successive events can be at least one of a voice event, the change in activities of the user 208 and the status change of the at least one device 206 present in the IoT environment. The configuring device 204 detects the first event and the successive events by continuously collecting and processing the information from the devices 206.

At step 406, the method includes estimating, by the configuring device 204, the contextual probability of the user initiating the interaction with the user interaction device 202. On determining the occurrence of the at least one of the first event and the successive events, the configuring device 204 estimates the contextual probability. The configuring device 204 estimates the contextual probability based on the occurrence of the events and the context. The context can be determined using the context parameters such as, but not limited to, the user context, the user PLM data, the device context, the history of voice interactions, and history of sequence of events and so on. From the history of sequence of events and history of voice command interactions from the user, the configuring device 204 can extract the meaningful patterns of sequence of events and the correlation. Using the correlation, the first event, and the successive events with the context, the configuring device 204 can predict with a confidence value that the likelihood of user initiating the voice conversation with the user interaction device 202. The confidence value indicates the contextual probability of initiating the voice conversation with the user interaction device 202. In an embodiment, the configuring device 204 uses the neural network model or any other machine learning algorithms to detect the contextual probability.

At step 408, the method includes configuring, by the configuring device 204, the dynamic wakeup time for switching the user interaction device 202 to the passive wakeup state. The configuring device 204 compares the estimated contextual probability with the pre-defined threshold value. On determining that the estimated contextual probability is not above the pre-defined threshold value, the configuring device 204 switches the user interaction device 202 to the sleep state. On determining that the contextual probability is above the pre-defined threshold, the configuring device 204 estimates the delta wakeup time duration for switching the user interaction device 202 to the passive wakeup state. In the passive wakeup state, the user interaction device 202 continues to be active in the background state for the delta wakeup time duration, listens to the user commands and provides the responses to the user 208 without any trigger word. The delta wakeup time duration can be configured based on the contextual probability and the history of user's voice interaction. The delta wakeup time duration may be directly proportional to the contextual probability. The delta wakeup time can be estimated dynamically based on the factors like type of the sequential events received, user context and so on.

The various actions, acts, blocks, steps, or the like in the method and the flow diagram 400 may be performed in the order presented, in a different order or simultaneously. Further, in some embodiments, some of the actions, acts, blocks, steps, or the like may be omitted, added, modified, skipped, or the like without departing from the scope of the disclosure.

Figure 5A:
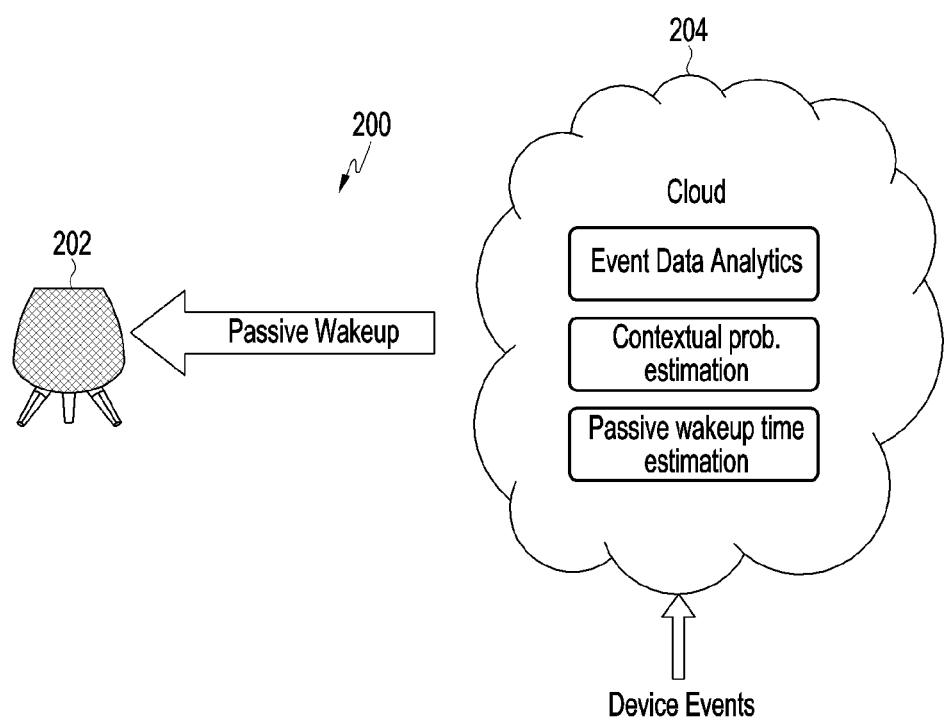
FIGS. 5A-5C illustrate example architectures of a system for configuring a dynamic wakeup time to activate a user interaction device, according to embodiments as disclosed herein.
Figure 5B:
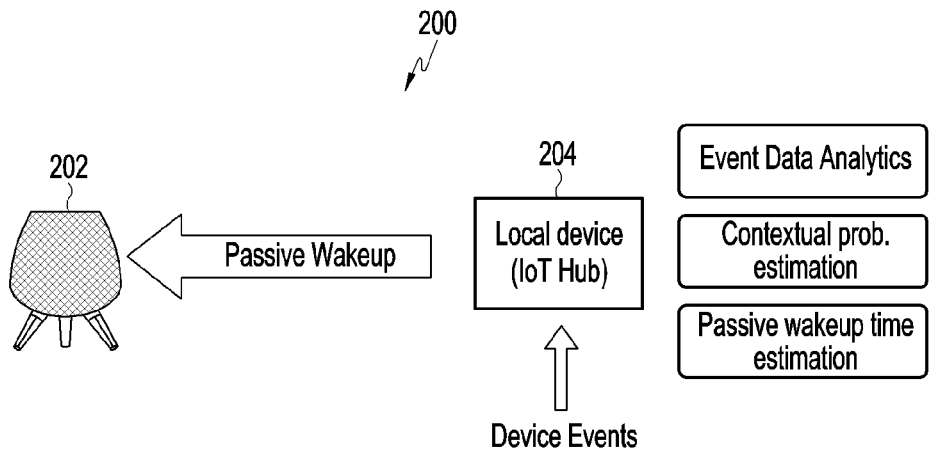
Figure 5C:
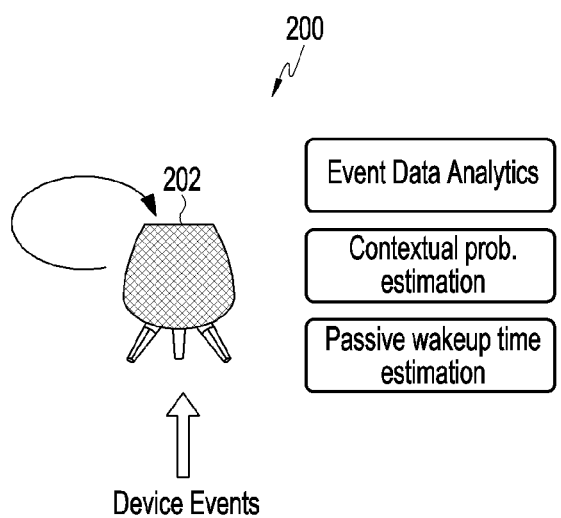

FIGS. 5A-5C illustrate example architectures of the system 200 for configuring the dynamic wakeup time to activate the user interaction device 202, according to embodiments as disclosed herein.

FIG. 5A illustrates an example architecture of the system 200, wherein the system 200 includes a cloud as the configuring device 204 for activating the user interaction device 202. The cloud 204 can be configured to detect the occurrence of at least one of the first event and the successive events associated with the at least one device 206 present in the IoT environment. The at least one of the first event and the successive events can be detected by continuously collecting and processing the information from the devices 206. Whenever there is a change in state of the at least one device 206, the cloud may identify the event. Once the occurrence of the at least one of the first event and the successive events is detected, the cloud 204 estimates the contextual probability of initiating the conversation by the user 208 with the user interaction device 202. The contextual probability can be estimated based on the user context, the user PLM data, the device context and the history of voice interactions and the history of the events. Based on the contextual probability, the cloud 204 determines the delta wakeup time duration to activate the user interaction device 202. The cloud 204 further sends the passive wakeup command to the user interaction device 202 to wake up for the estimated delta wakeup time duration. Thus, the user interaction device 202 can be switched from the sleep state to the active state without receiving the wakeup word from the user 208.

FIG. 5B illustrates an example architecture of the system 200, wherein the system 200 includes a local device (at least one of a hub, a router and so on) as the configuring device 204 for activating the user interaction device 202. The local device 204 can be present locally in the IoT environment and be in communication with the user interaction device 202. The local device 204 detects the occurrence of the events associated with the devices 206 and accordingly estimates the contextual probability of initiating the conversation by the user 208. Based on the estimated contextual probability, the local device 204 configures the delta wakeup time duration. The local device 204 further sends the passive wakeup command to the user interaction device 202 which in turn wakes up for the estimated duration.

FIG. 5C illustrates an example architecture of the system 200, wherein the system 200 includes the user interaction device 202 and the user interaction device 202 itself activates based on the contextual probability. The user interaction device 202 itself analyzes the occurrence of the events associated with the devices 206 and determines the contextual probability of initiating the conversation by the user 208. Based on the contextual probability, the user interaction device 202 can estimate the expected wakeup time and wake itself into the passive wakeup state/passive listening mode.

Figure 6:
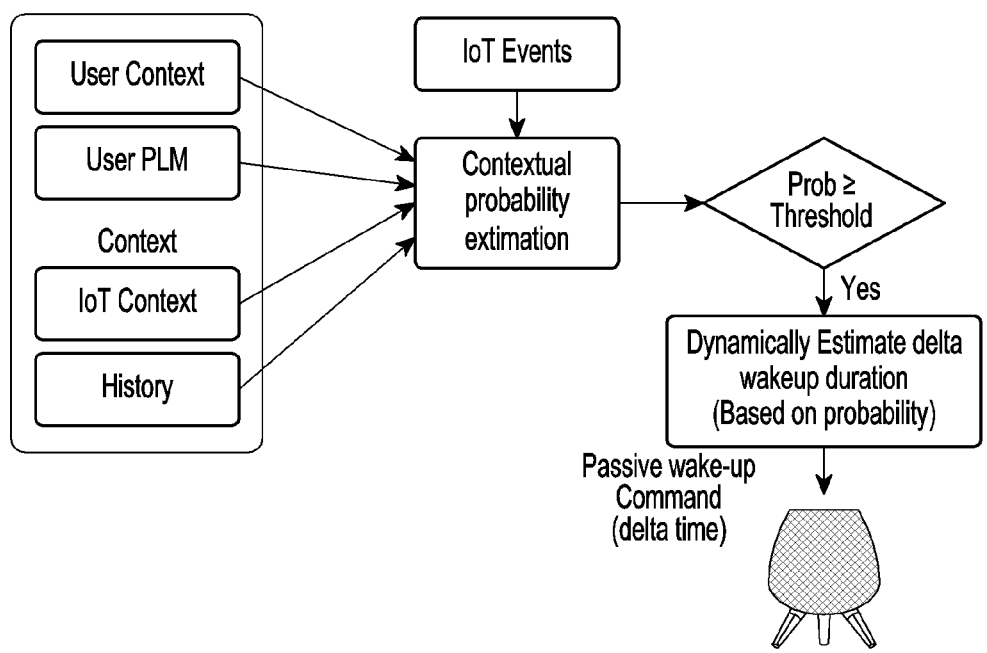
FIG. 6 is an example flow diagram illustrating a method for contextual probability based activation of a user interaction device, according to embodiments as disclosed herein.

FIG. 6 is an example flow diagram illustrating a method for contextual probability based activation of the user interaction device 202, according to embodiments as disclosed herein. As illustrated in FIG. 6, the configuring device 204 computes the contextual probability of initiating the conversation by the user 208 with the user interaction device 202. The configuring device 204 computes the contextual probability on determining the occurrence of the events associated with the devices 206. The configuring device 204 computes the contextual probability based on the context and the detected events. The context can be determined using the parameters such as, but not limited to, the user context, the user PLM data, the device context, the history of voice interactions and so on. The user context includes information about presence of the user(s) in the IoT environment (for example, providing information about how many users are watching TV, how many users are present in a car and so on), the location of the user (for example, the user is at home or office, the user is in a car and so on) and the activities of the user (for example, opening the door, booking the cab, wakeup from sleep and so on). The user PLM data includes information about the user's schedule such as meetings, intersected events, calls, user's voice parameters (tone, pitch, amplitude, frequency or the like), user's regular activities and corresponding timing information and so on. The device context can include information about the sensor data (camera capturing user's intention to talk with the user interaction device 202), the status of the devices 206 (TV, mobile, oven, speaker and so on) present in the IoT environment, and so on.

The configuring device 204 further checks whether the computed contextual probability is greater than or equal to the pre-defined threshold value. On determining that the computed contextual probability is lesser than the pre-defined threshold, the user interaction device 202 continues in the sleep state. On determining that the contextual probability is greater than or equal to the pre-defined threshold, the configuring device 204 dynamically estimates the delta wakeup time duration based on the contextual probability and the history of user's voice interactions. Further, the configuring device 204 sends the passive wakeup command indicating the estimated delta wakeup duration to the user interaction device 202. On receiving the passive wakeup command from the configuring device 204, the user interaction device 202 wakes up and continues to be in the wakeup state for the estimated delta wakeup duration. Thus, the user 208 can interact with the user interaction device 202 without using any trigger word.

Figure 7A:
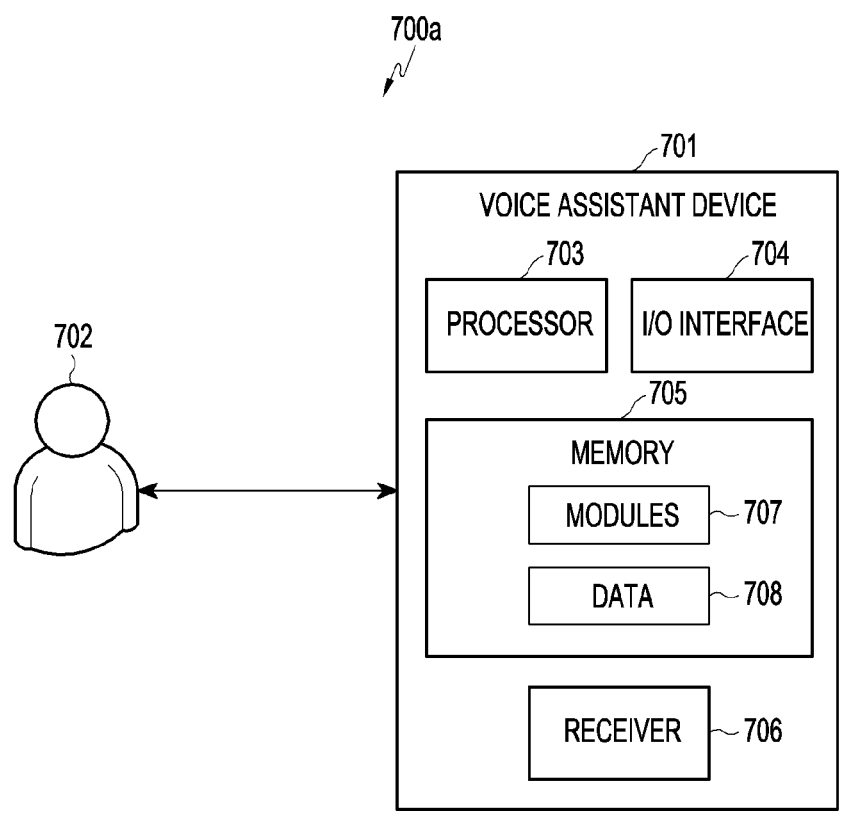
FIGS. 7A-7C shows example environments of a voice assistant device, according to embodiments as disclosed herein.

FIG. 7A shows an example environment of a voice assistant device 701. The voice assistant device 701 may be configured to perform voice recognition, speech synthesis, and Natural Language Processing (NLP) to provide a service to at least one user 702. The voice assistant device 701 may implement Artificial Intelligence (AI) to provide service to at least one user 702. The voice assistant device 701 may be associated with a trigger to initiate the service to the at least one user 702. When not in use, the voice assistant device 701 is configured to be operated in sleep-mode and when in use, the voice assistant device 701 is configured to be operated in wake-up mode. The voice assistant device 701 may switch from the sleep mode to the wake-up mode, when a trigger is provided to the voice assistant device 701. In an embodiment, the trigger may be a particular word associated with the voice assistant device 701. When the at least one user 702 says the trigger, the voice assistant device 701 is initiated to listen to request followed by the trigger. Usually, the request is said by the at least one user 702 to the voice assistant device 701. The request may be in form of voice input that is received by the voice assistant device 701. In an embodiment, the voice assistant device 701 may be dedicated hardware component, which is registered with an account of the at least one user 702. In an embodiment, the voice assistant device 701 may be embedded in user device of the at least one user 702. For example, the voice assistant device 701 may be embedded in smart phone, smart watch, tablet, laptops and so on of the at least one user 702. In an embodiment, the voice assistant device 701 may be embedded in an infotainment system of a vehicle of the at least one user 702. In an embodiment, the voice assistant device may be embedded in an apparatus and is configured to control the apparatus using voice commands. The apparatus may include, but is not limited to, refrigerator, fridge, TV, washing machine, music player, and so on. The voice assistant device 701 may be any device which receives voice inputs from the at least one user 702 and provides service based on the voice inputs. In an embodiment, the voice assistant device 701 may be connected with other devices or applications to provide service to the at least one user 702. For example, if the voice assistant device 701 is embedded in a vehicle, the voice assistant device 701 may be connected with music system, navigation system, lighting system and so on of the vehicle. In case, the at least one user 702 requests the voice assistant device 701 for navigating to a destination, the voice assistant device 701 may communicate with the navigation system, to provide service to the at least one user 702. Consider, the voice assistant device 701 is placed in a home environment. The voice assistant device 701 may be connected with home appliances in the home environment, to control operation of the home appliances. The home appliances may be controller based on requests from the at least one user 702. For example, if the at least one user 702 requests to switch ON AC. The voice assistant device 701 may communicate to control operation of the AC and switch the AC ON. With further request, the voice assistant device 701 may be configured to control temperature of the AC, as well.

In an embodiment, the voice assistant device 701 may be associated with one or more output means to provide response to the at least one user 702. In an embodiment, the one or more output means may include display unit, audio output unit, Light Emitting Diodes (LEDs) and so on. The response may be provided via visual display or audio outputs or may be indicated via the LEDs. One or more other means, known in the art, may be implemented in the voice assistant device 701, for providing response to the at least one user 702.

Further, the voice assistant device 701 may include a processor 703, I/O interface 704, a memory 705 and a receiver 706. In some embodiments, the memory 705 may be communicatively coupled to the processor 703. The memory 705 stores instructions, executable by the processor 703, which on execution, may cause the voice assistant device 701 to provide services to the at least one user 702. In an embodiment, the memory 705 may include one or more modules 707 and data 708. The one or more modules 707 may be configured to perform the steps of the present disclosure using the data 708, to provide the services to the at least one user 702. In an embodiment, each of the one or more modules 707 may be a hardware unit which may be outside the memory 705 and coupled with the voice assistant device 701. The voice assistant device 701 may be implemented in a variety of computing systems, such as a laptop computer, a desktop computer, a Personal Computer (PC), a notebook, a smartphone, a tablet, e-book readers, a server, a network server, and the like.

In an embodiment, the voice assistant device 701 may be controlled by a control apparatus 709. The control apparatus 709 may be configured to control operation of the voice assistant device 701 based on at least one voice input received from the at least one user 702. Further, the control apparatus 709 may be configured to identify intent associated with the at least one voice input from the at least one user 702. In an embodiment, the intent may convey context or meaning of the at least one voice input received from the at least one user 702. In an embodiment, the intent associated with the at least one voice input may be identified by performing Natural-Language Understanding (NLU) on the at least one voice input. In an embodiment, conversation knowledge of previous voice inputs of the voice assistant device 701 may be used to determine the intent of the received at least one voice input.

Further, the probability of issuance of a subsequent voice input from the at least one user 702 is determined for the at least one voice input. The probability may be determined based on at least one of the intent, historic data and one or more contextual factors is determined. The historic data may be associated with the at least one user 702. In an embodiment, the historic data may include past requests of the at least one user 702 and corresponding response provided by the voice assistant device 701. In an embodiment, the historic data may include time of request, day of request, location of request, and other data related to the past requests from the at least one user 702. In an embodiment, the one or more contextual factors may include at least one of user related factors, time related factors data and environment related factors. In an embodiment, the user related factors may include daily routines, location, preferences and so on, related to the at least one user 702. In an embodiment, time related data may include time of the request, day of the request, if the request is in morning, afternoon or evening and so on. In an embodiment, the environment related factors include connectivity details and status details of appliances or applications connected with the voice assistant device 701. One or more other factors, which may be used for determining the probability of issuance of the subsequent voice input may be included in the one or more contextual factors.

In an embodiment, the probability determination apparatus 710 associated with the control apparatus 709 and the voice assistant device 701 may be configured to determine the probability of issuance of the subsequent voice input. For determining the probability of issuance, the probability determination apparatus 710 may be configured to d extract one or more keywords from plurality of words in the at least one voice input. The one or more keywords may be extracted based on intent of the at least one voice input. In an embodiment, the one or more keywords may be extracted by assigning weightage to each of the plurality of words of the at least one voice input. Further, keywords from the plurality of words, with weightage greater than a predefined weightage value, may be identified to be the one or more keywords.

In an embodiment, the probability determination apparatus 710 may be configured to build a conversation knowledge for the at least one voice input, based on the one or more extracted keywords. In an embodiment, the conversion knowledge may be used for identifying the intent of subsequent voice inputs to the voice assistant device 701.

Upon extracting the one or more keywords, domain associated with the at least one voice input may be identified based on the one or more keywords. Further, domain matching scores are computed for the identified domain with plurality of pre-stored domains associated with the at least one user 702. The probability determination apparatus 710 determines the probability of issuance of the subsequent voice input to the voice assistant device 701, based on the domain matching scores, the one or more contextual factors and the historic data associated with the at least one user 702.

Upon determining the probability of issuance of the subsequent voice input, the control apparatus 709 may be configured to compare the probability with a predefined threshold value. In an embodiment, the predefined threshold value may be determined by analyzing the historic data, through devices connected to the voice assistance device 701. When the determined probability is greater than the predefined threshold value, extended wake-up duration of the voice assistant device 701 may be determined. Further, the duration of the wake-up mode of the voice assistant device 701 may be extended for the extended wake-up duration, to receive the subsequent voice input from the at least one user 702. In an embodiment, the extended wake-up duration may be estimated to be directly proportional to the probability of issuance of the subsequent voice input. For example, if the determined probability is high, the extended wake-up duration may be determined to be for a longer duration. Similarly, when the determined probability is low but equal or greater than the predefined threshold value, the extended wake-up duration may be determined to be for a shorter duration.

In an embodiment, when the probability is determined to be lesser than the predefined threshold value. The control apparatus 709 may configure the voice assistant device 701 to be in the sleep mode, until a trigger to operate the voice assistant device 701 in the wake-up mode is detected.

Further, during the extended wake-up duration, if absence of the subsequent voice input is detected, the voice assistant device 701 may be configured to be in the sleep-mode.

Figure 7B:
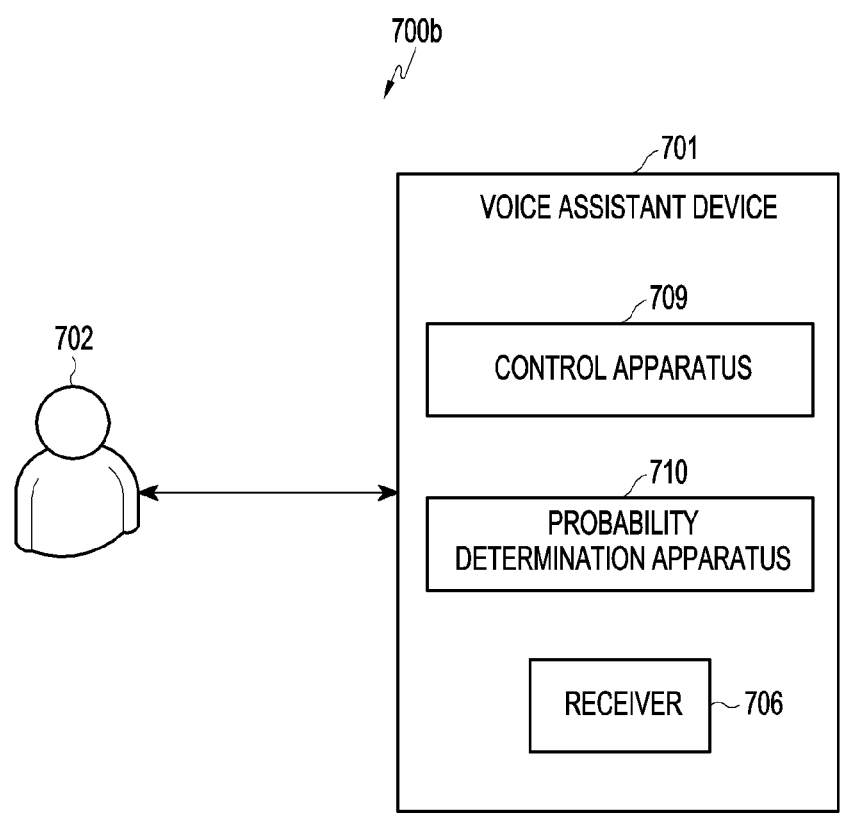
Figure 7C:
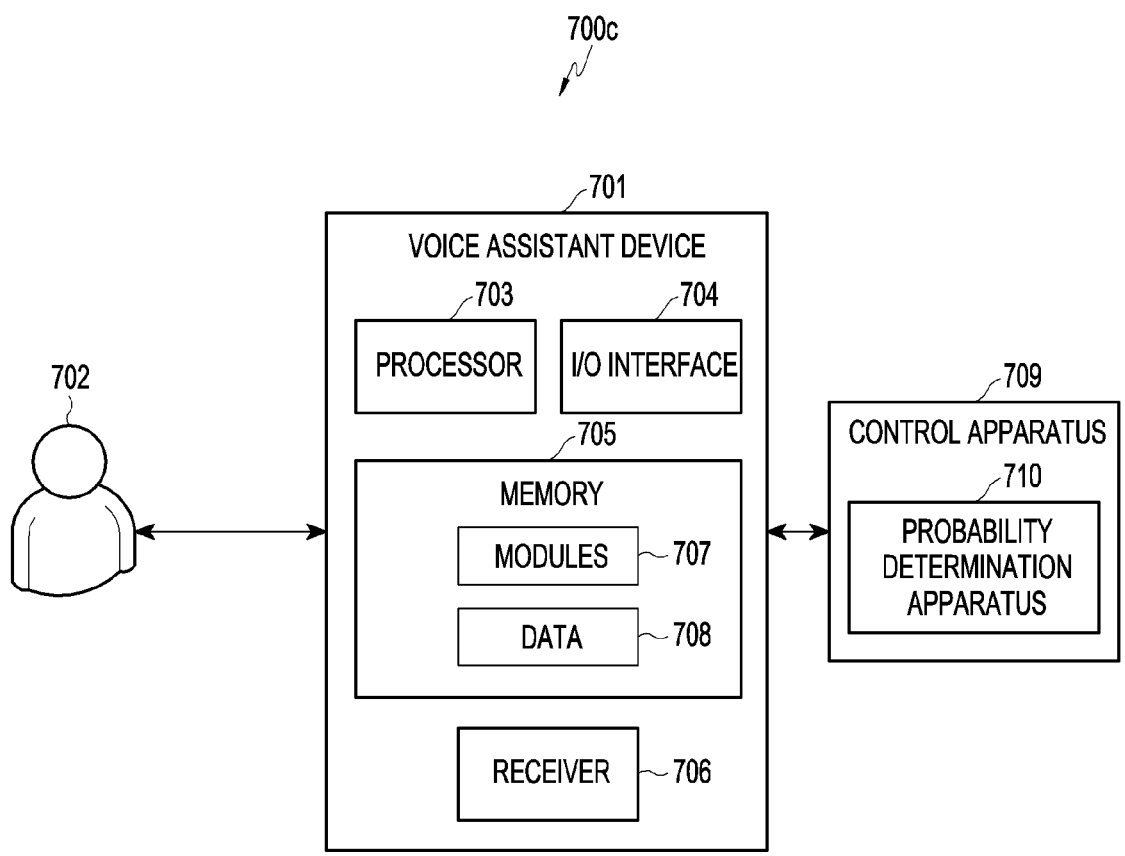

In an embodiment, the control apparatus 709 and the probability determination apparatus 710 may be integral part of the voice assistant device 701 as shown in FIG. 7B. The at least one voice input received by the receiver 706 may be used by the control apparatus 709 to control the voice assistant device 701, and the probability determination apparatus 710 to determine the probability of issuance of the subsequent voice input. In an embodiment, the probability determination apparatus 710 may be an integral part of the control apparatus 709 (not shown in FIG. 7B). In an embodiment, the control apparatus 709 and the probability determination apparatus 710 may be a dedicated server or a cloud-based server which is in communication with the voice assistant device 701, as shown in FIG. 7C. The voice assistant device 701 may communicate with such server via a communication network (not shown in figure). The communication network includes, but is not limited to, a direct interconnection, a Peer to Peer (P2P) network, Local Area Network (LAN), Wide Area Network (WAN), wireless network (e.g., using Wireless Application Protocol), Controller Area Network (CAN), the Internet, Wi-Fi, and such. The I/O interface 704 of the voice assistant device 701 may assist in transmitting and receiving data. Received data may include the at least one voice input, instructions from the control apparatus 709 and so on. Transmitted data may include the at least one voice input to the control apparatus 709, response to the at least one user 702 and so on.

Figure 8:
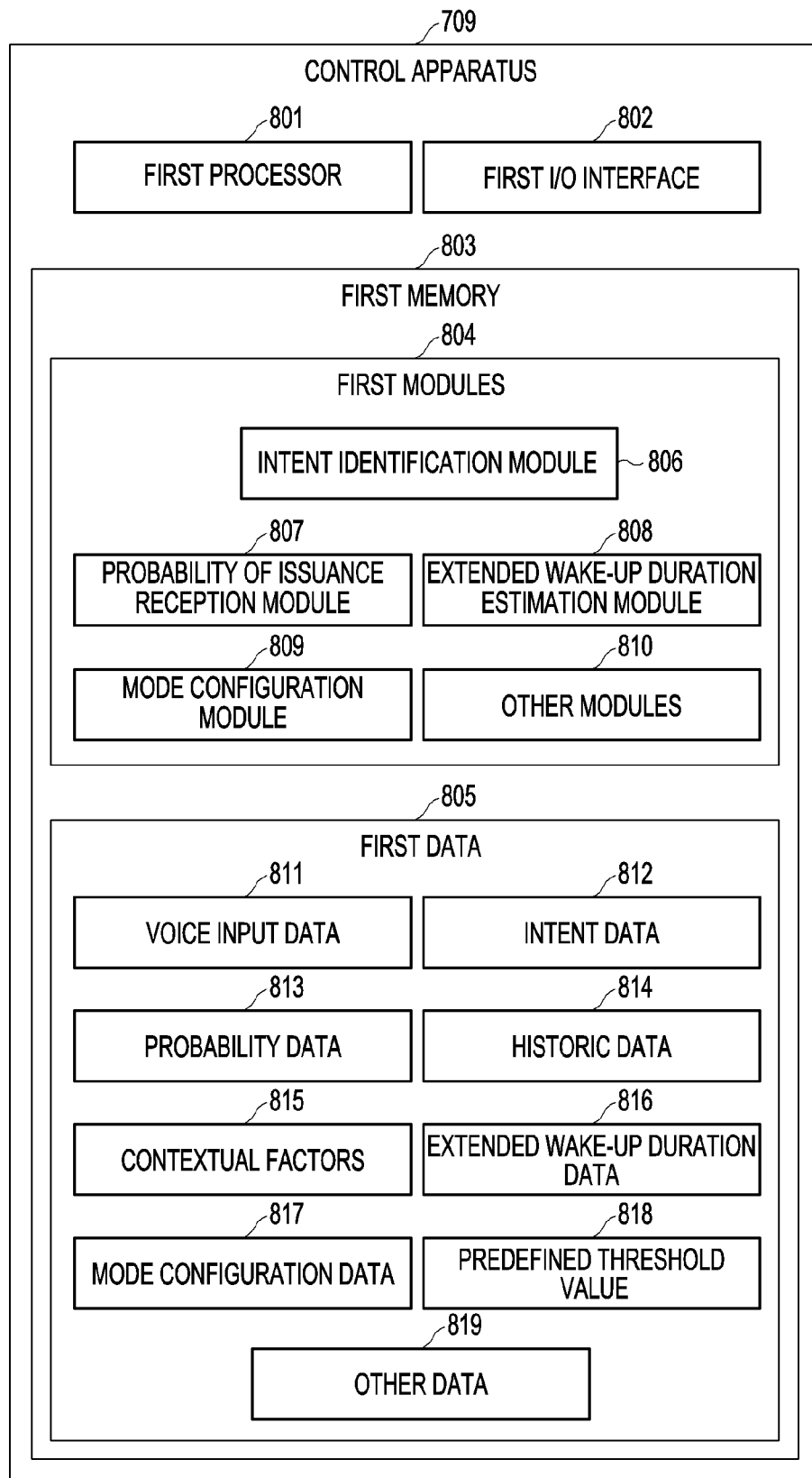
FIG. 8 shows a detailed block diagram of a control apparatus for controlling a voice assistant device, according to embodiments as disclosed herein.

FIG. 8 shows a detailed block diagram of the control apparatus 709 for controlling the voice assistant device 701.

The control apparatus 709 may include a first processor 801, first I/O interface 802 and a first memory 803. In some embodiments, the first memory 803 may be communicatively coupled to the first processor 801. The first memory 803 stores instructions, executable by the first processor 801, which, on execution, may cause the control apparatus 709 to control the voice assistant device 701. In an embodiment, the first memory 803 may include one or more first modules 804 and first data 805. The one or more first modules 804 be configured to perform the steps of the present disclosure using the first data 805, to provide control the voice assistant device 701. In an embodiment, each of the one or more first modules 804 may be a hardware unit which may be outside the first memory 803 and coupled with the control apparatus 709. The control apparatus 709 may be implemented in a variety of computing systems, such as a laptop computer, a desktop computer, a Personal Computer (PC), a notebook, a smartphone, a tablet, e-book readers, a server, a network server, and the like.

The first data 805 and the one or more first modules 804 in the first memory 803 of the control apparatus 709 may be described herein in detail.

In one implementation, the one or more first modules 804 may include, but are not limited to, an intent identification module 806, a probability of issuance determination module 807, an extended wake-up duration estimation module 808, mode configuration module 809 and one or more other modules 810, associated with the control apparatus 709.

In an embodiment, the first data 805 in the first memory 803 may comprise voice input data 811 (also referred to as at least one voice input 811), intent data 812 (also referred to as intent 812), probability data 813 (also referred to as probability of issuance 813), historic data 814, contextual factors 815 (also referred to as one or more contextual factors 815), extended wake-up duration data 816 (also referred to extended wake-up duration 816), mode configuration data 817, predefined threshold value 818 and other data 819 associated with the control apparatus 709.

In an embodiment, the first data 805 in the first memory 803 may be processed by the one or more first modules 804 of the control apparatus 709. In an embodiment, the one or more first modules 804 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

The control apparatus 709 may be configured to control the operation of the voice assistant device 701 based on at least one voice input 811 received by the voice assistant device 701. The at least one voice input 811 may be processed by the control apparatus 709 to control the voice assistant device 701. In an embodiment, each of voice inputs provided to the voice assistant device 701 may be dynamically provided to the control apparatus 709, to dynamically control the voice assistant device 701.

Upon receiving the at least one voice input 811, the intent identification module 806 of the control apparatus 709 may be configured to identify the intent 812 of the at least one voice input 811. In an embodiment, the intent 812 of the at least one voice input 811 may be identified by performing voice recognition, voice synthesis, NLU on the at least one voice input 811. In an embodiment, the conversation knowledge of previous voice inputs of the voice assistant device 701 may be used to determine the intent 812 of the received at least one voice input 811. One or more other processing techniques, known to a person skilled in the art, may be implemented in the intent identification module 806 to identify the intent 812 of the at least one voice input 811.

Further, the probability of issuance reception module 807 may be configured to receive the probability of issuance 813 of a subsequent voice input from the probability determination apparatus 710. In an embodiment, the probability determination apparatus 710 may be one of the other modules 810 of the control apparatus 709. In an embodiment, the probability determination apparatus 710 may be connected with the control apparatus 709 via a communication network. The probability determination apparatus 710 may determine the probability of issuance 813 and the probability of issuance reception module 807 may be configured to communicate with the probability determination apparatus 710 to receive the determined probability of issuance 813.

Figure 9:
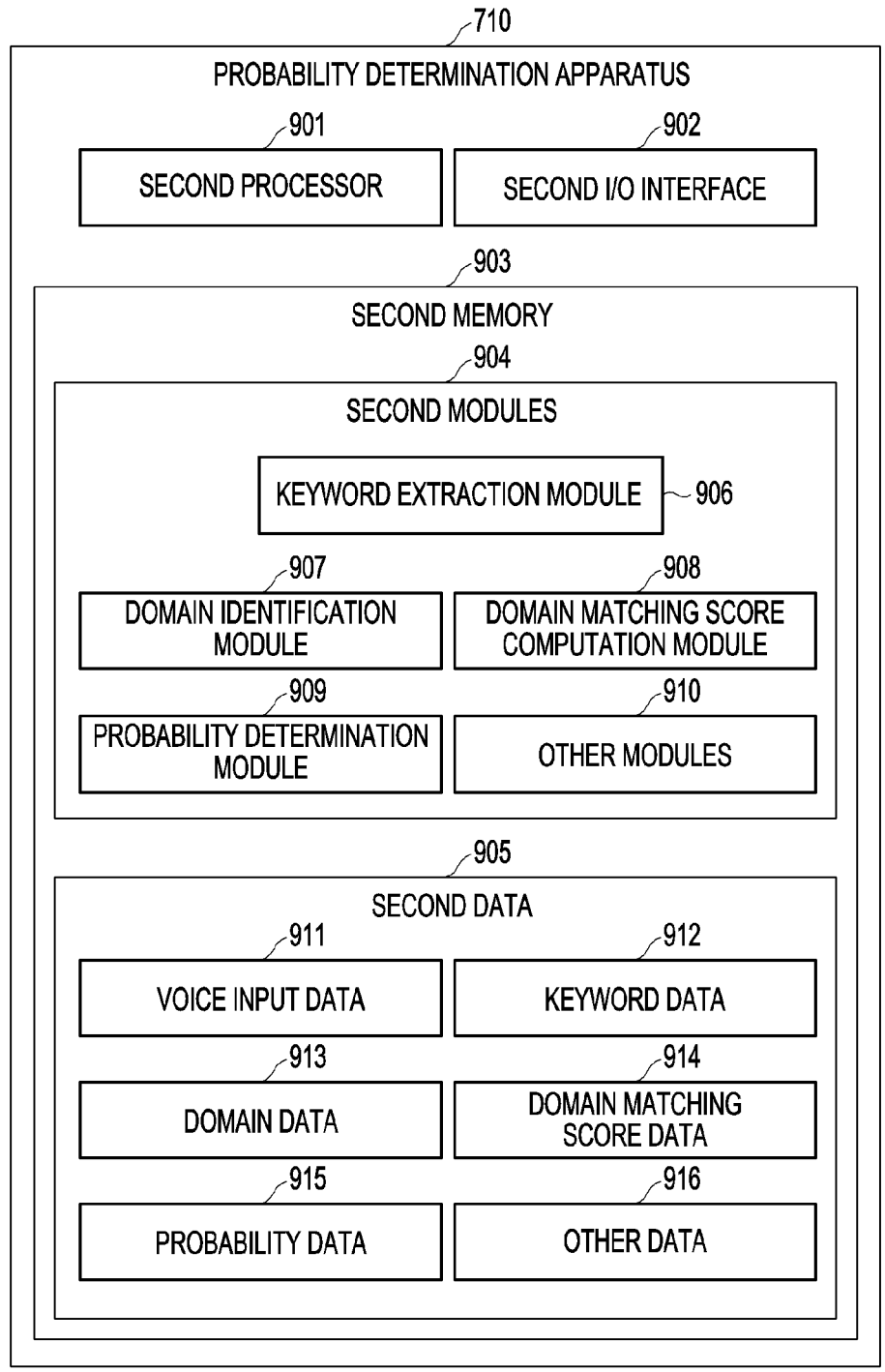
FIG. 9 shows a detailed block diagram of a probability determination apparatus for determining probability of issuance of a subsequent voice input to a voice assistant device, according to embodiments as disclosed herein.

FIG. 9 shows a detailed block diagram of the probability determination apparatus 710 for determining the probability of issuance 813.

The probability determination apparatus 710 may include a second processor 901, second I/O interface 902 and a second memory 903. In some embodiments, the second memory 903 may be communicatively coupled to the second processor 901. The second memory 903 stores instructions, executable by the second processor 901, which, on execution, may cause the probability determination apparatus 710 to determine the probability of issuance 813. In an embodiment, the second memory 903 may include one or more second modules 904 and second data 905. The one or more second modules 904 may be configured to perform the steps of the present disclosure using the second data 905, to determine the probability 813. In an embodiment, each of the one or more second modules 904 may be a hardware unit which may be outside the second memory 903 and coupled with the probability determination apparatus 710. The probability determination apparatus 710 may be implemented in a variety of computing systems, such as a laptop computer, a desktop computer, a Personal Computer (PC), a notebook, a smartphone, a tablet, e-book readers, a server, a network server, and the like.

The second data 905 and the one or more second modules 904 in the second memory 903 of the probability determination apparatus 710 may be described herein in detail.

In one implementation, the one or more second modules 904 may include, but are not limited to, keyword extraction module 906, a domain identification module 907, domain matching score computation module 908, probability determination module 909 and one or more other modules 910, associated with the probability determination apparatus 710.

In an embodiment, the second data 905 in the second memory 903 may comprise voice input data 911 (also referred to as at least one voice input 911), keyword data 912 (also referred to as one or more keywords 912), domain data 913 (also referred to as domain 913), domain matching score data 914 (also referred to as domain matching scores 914), probability data 915 (also referred to probability of issuance 915), and other data 916 associated with the probability determination apparatus 710. In an embodiment, the voice input data 811 in the first memory 803 of the control apparatus 709 may be same as the voice input data 911 in the second memory 903 of the probability determination apparatus 710. In an embodiment, the probability data 814 in the first memory 803 of the control apparatus 709 may be same as the probability data 915 in the second memory 903 of the probability determination apparatus 710.

In an embodiment, the second data 905 in the second memory 903 may be processed by the one or more second modules 904 of the probability determination apparatus 710. In an embodiment, the one or more second modules 904 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

The keyword extraction module 906 may be configured to extract the one or more keywords 912 from plurality of words in the at least one voice input 911. In an embodiment, the keyword extraction module 906 may be configured to identify the plurality of words in the at least one voice input 911. Once the plurality of words are identified, each of the plurality of words are assigned weights. In an embodiment, each of the plurality of words are assigned weights based on the intent 812 of the at least one voice input 911. For example, words which are in closer relation with the intent 812 of the at least one voice input 911 may be assigned with higher weights and words which are least related to the intent 812 may be assigned with lower weights. Further, the keyword extraction module 906 may be configured to identify words with weightage greater than a predefined weightage value, to be the one or more keywords 912 of the at least one voice input 911. Such one or more keywords 912 represent the at least one voice input 911. The domain identification module 907 may be configured to use the one or more keywords 912 to identify the domain 913 associated with the at least one voice input 911. In an embodiment, the probability determination apparatus 710 may be associated with a repository which include plurality of pre-stored domains related to the voice assistant device 701. In an embodiment, the plurality of pre-stored domains may be identified and stored in the repository based on previous voice inputs or requests from the at least one user 702. In an embodiment, the plurality of pre-stored domains may include entertainment, news, sports, music, appliance configurations and so on. Further, each of the plurality of pre-stored domains may be associated with corresponding keywords. Upon extracting the one or more keywords 912 from the at least one voice input 911, the one or more keywords 912 may be matched with keywords of the plurality of pre-stored domains. By such matching, the domain 913 associated with the at least one voice input 911 may be identified by the domain identification module 907.

Further, the domain matching score computation module 908 may be configured to compute domain matching scores 914 for the identified domain 913. In an embodiment, the domain matching scores 914 may be computed for the domain 913 with each of the plurality of pre-stored domains. Further, based on the domain matching scores 914, the probability determination module 909 of the probability determination apparatus 710, may be configured to determine the probability of issuance 915 of the subsequent voice input to the voice assistant device 701. Further, for determining the probability 915, the one or more contextual factors 815 and the historic data 814 are also considered along with the domain matching scores 914. In an embodiment, the historic data 814 may include past requests of the at least one user 702 and corresponding response provided by the voice assistant device 701. In an embodiment, the historic data 814 may include time of request, day of request, location of request, and other data related the past requests from the at least one user 702. In an embodiment, the one or more contextual factors 815 include at least one of user related factors, time related factors data and environment related factors. For example, upon waking-up, consider the at least one user 702 has a habit to the trigger the voice assistant device 701 and give commands to retrieve information related to weather, news and traffic. In that case, upon receiving initial command from the at least one user 702 in morning, the probability of issuance 915 of subsequent voice input may be determined to be high. Similarly, consider the at least one user 702 is asking questions related to a single domain continuously. Since, there is possibility that the at least one user 702 may ask further questions related to the single domain, the probability 915 may be determined to be high. Further, consider the user commands to switch on TV and then engages in a phone call. In such case, the probability 915 may be determined to be low, since possibility of receiving further commands from the at least one user 702 is low.

In an embodiment, other modules of the probability determination apparatus 710 may include conversation knowledge building module which is configured to build the conversation knowledge for the at least one voice input 911, based on the one or more extracted keywords 912. Such conversation knowledge may be built for each conversation of the at least one user 702 with the voice assistant device 701. In an embodiment, the conversation knowledge may be stored in the repository.

In an embodiment, the intent identification module 806 may be configured to use the conversation knowledge of previous conversations of the at least one user 702, to identify the intent 812 of the at least one voice input 811.

The probability of issuance 915 is determined by the probability determination apparatus 710 and provided to the control apparatus 709. Based on the probability 813, the extended wake-up duration estimation module 808 may be configured to determine the extended wake-up duration 8167 for the voice assistant device 701. Initially, the probability 813 is compared with the predefined threshold value 818. In case, the determined probability 813 is greater than the predefined threshold value 818, extended wake-up duration 816 of the voice assistant device 701 may be determined. Further, the duration of the wake-up mode of the voice assistant device 701 may be extended for the extended wake-up duration 816, to receive the subsequent voice input from the at least one user 702. In an embodiment, the predefined threshold value 818 may be determined by analyzing the historic data 814, through devices connected to the voice assistant device 701. For example, if the at least one user 702 frequently indulges in deep conversations with the voice assistant device 701, the predefined threshold value 818 may be selected to be of a lower value. In case, even with lesser value of the probability 813, the extended wake-up duration 816 may be determined. Similarly, consider the at least one user 702 mainly uses the voice assistant device 701 to control the home appliances and less for retrieving news updates. When the intent 812 is related to news updates, the predefined threshold value 818 may be set to higher value, since higher probability is required to extend the wake-up duration.

In an embodiment, the extended wake-up duration 816 may be estimated to be directly proportional to the probability of issuance 813 of the subsequent voice input. For example, if the determined probability 813 is high, the extended wake-up duration 816 may be determined to be for a longer duration. Similarly, when the determined probability 813 is low but equal or greater than the predefined threshold value 818. The extended wake-up duration 816 may be determined to be for a shorter duration.

Further, upon determining the extended wake-up duration 816, the mode configuration module 809 may configure the voice assistant device 701 to operate in the wake-up mode for the extended wake-up duration 816. In an embodiment, when the probability 813 is determined to be lesser than the predefined threshold value 818, the mode configuration module 809 may configure the voice assistant device 701 to be operated in the sleep-mode, until a trigger to operate in the wake-up mode is detected. Further, during the extended wake-up duration 816, if absence of the subsequent voice input is detected, the mode configuration module 809 may configure the voice assistant device 701 to be operated in the sleep-mode. Mode at which the voice assistant device 701 is to be operated is stored as the mode configuration data 817. The mode configuration data 817 may be one of the sleep mode and the wake-up mode.

The other data 820 and 917 may store data, including temporary data and temporary files, generated by modules for performing the various functions of the control apparatus 709 and the probability determination apparatus 710. The one or more first modules 804 and the one or more second modules 904 may also include other modules 810 and 910, respectively, to perform various miscellaneous functionalities of the control apparatus 709 and the probability determination apparatus 710. It will be appreciated that such modules may be represented as a single module or a combination of different modules.

Figure 10A:
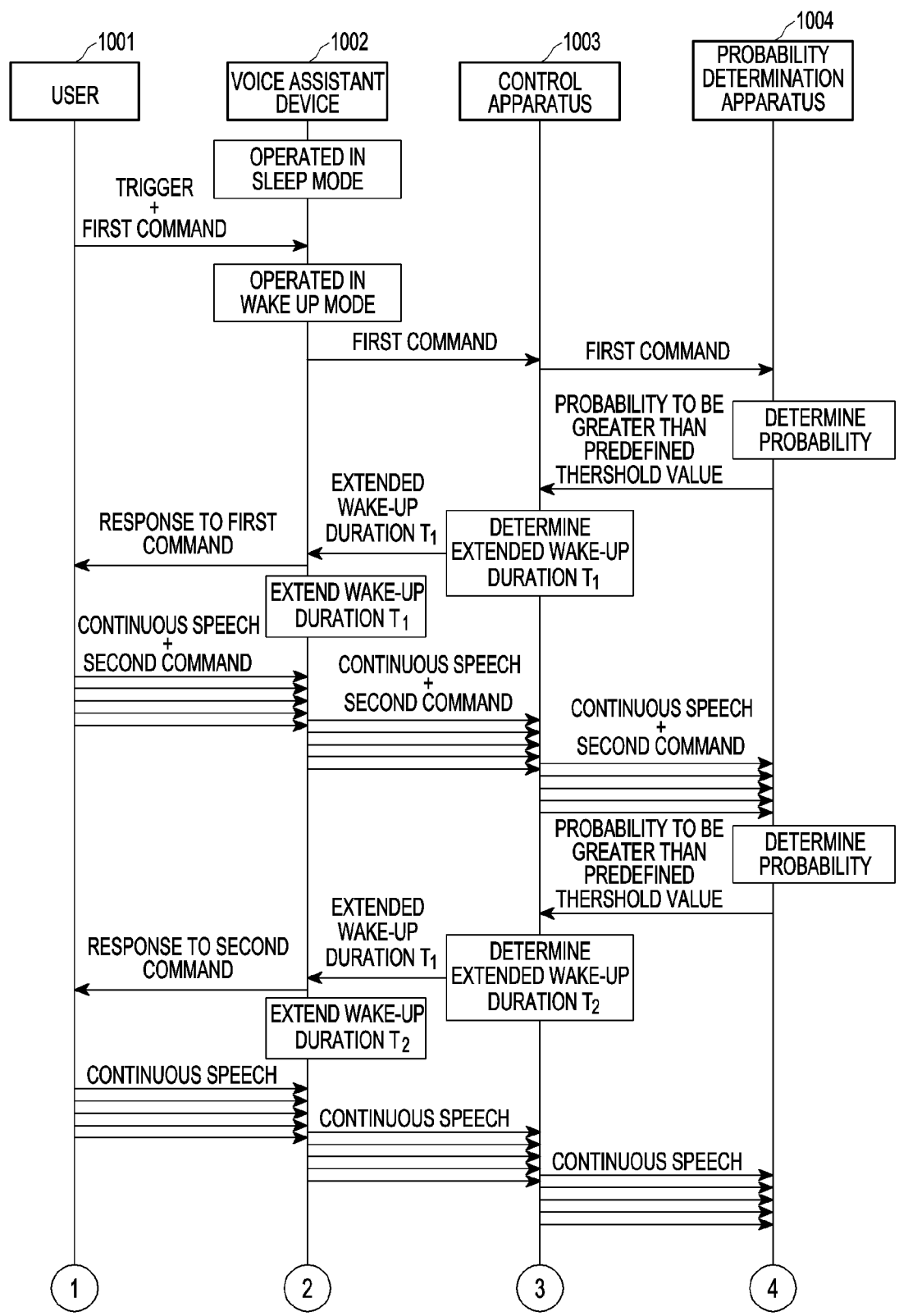
FIGS. 10A-B illustrates a schematic diagram for controlling a voice assistant device, according to embodiments as disclosed herein.
Figure 10B:
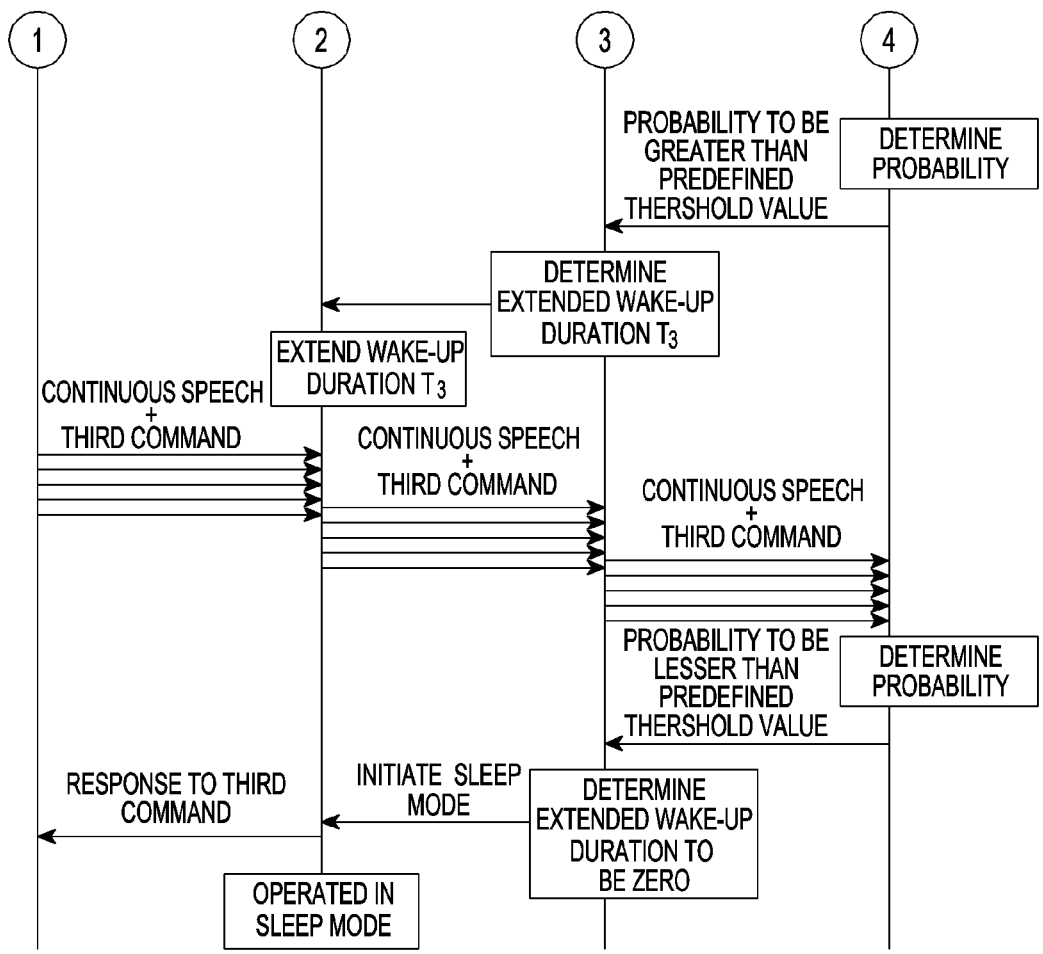

FIGS. 10A-10B illustrates an example schematic diagram for controlling the voice assistant device 701. Consider user 1001 is associated with a voice assistant device 1002. The voice assistant device 1002 may be controlled by the control apparatus 1003 using a probability determination apparatus 1004.

Initially, the voice assistant device 1002 may be operated in the sleep mode. When a trigger and a first command is received from the user 1001, the voice assistant device 1002 may be operated in a wake-up mode. The control apparatus 1003 receives the first command which is provided to determine the probability of issuance by the probability determination apparatus 1004. When the probability is greater than the predefined threshold value, the extended wake-up duration T1 with respect to the first command is determined. Along with response to the first command, the wake-up mode of the voice assistant device 1002 is extended to the extended wake-up duration T1. Some of use cases in association with controlling the voice assistant device 1002 is described below.

Figure 11A:
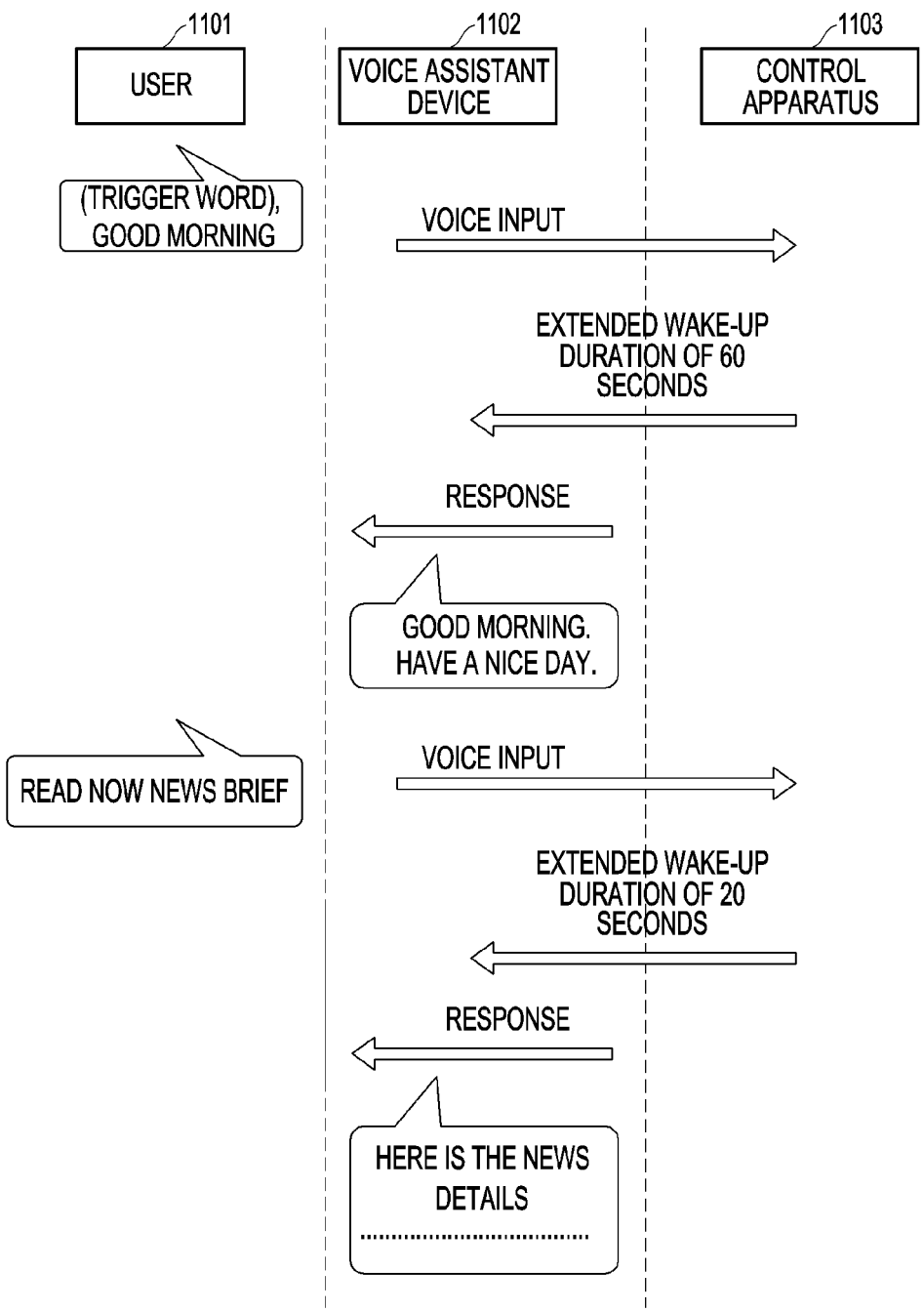
FIGS. 11A-11F illustrate example embodiments of a voice assistant device, according to embodiments as disclosed herein.

Consider an example embodiment as illustrated in FIG. 11A. Consider user 1101 has a habit of requesting news updates from a voice assistant device 1102 at mornings. The user 1101 initiates service of the voice assistant device 1102 by providing voice input as "(TRIGGER WORD), GOOD MORNING". The voice input is received by the voice assistant device 1102 and provided to the control unit 1103 including the probability determination apparatus (not shown in the example embodiments). Since historic data includes to request further requests from the user 1101, probability of issuance of subsequent voice inputs may be determined to be higher. Hence, the extended wake up duration may be determined to be for a longer duration. For example, in such cases, the extended wake-up duration may be 60 seconds. Using Natural Language Generation (NLG), the response to the voice input may be provided as "GOOD MORNING, HAVE A NICE DAY". Along with the response, the wake-up duration may also be extended to 60 seconds. As predicted, the user 1101 may provide subsequent voice input as "READ NEWS UPDATES". The voice input is received by the voice assistant device 1102 and provided to the control apparatus 1103. Since historic data of the user 1101 indicates that the user 1101 usually requests for only news updates at mornings, and also that the news updates are already provided to the user 1101, the probability may be low. Accordingly, the extended wake-up duration may be for shorter duration. For example, the extended wake-up duration in relation to subsequent voice input may be 20 seconds. Using NLG, the response to the voice input may be provided as "HERE IS THE NEWS UPDATE . . . ". Along with the response, the wake-up duration may also be extended to 20 seconds. If no voice inputs are received within said 20 seconds, the voice assistant device 1102 may be configured to be in the sleep mode.

Figure 11B:
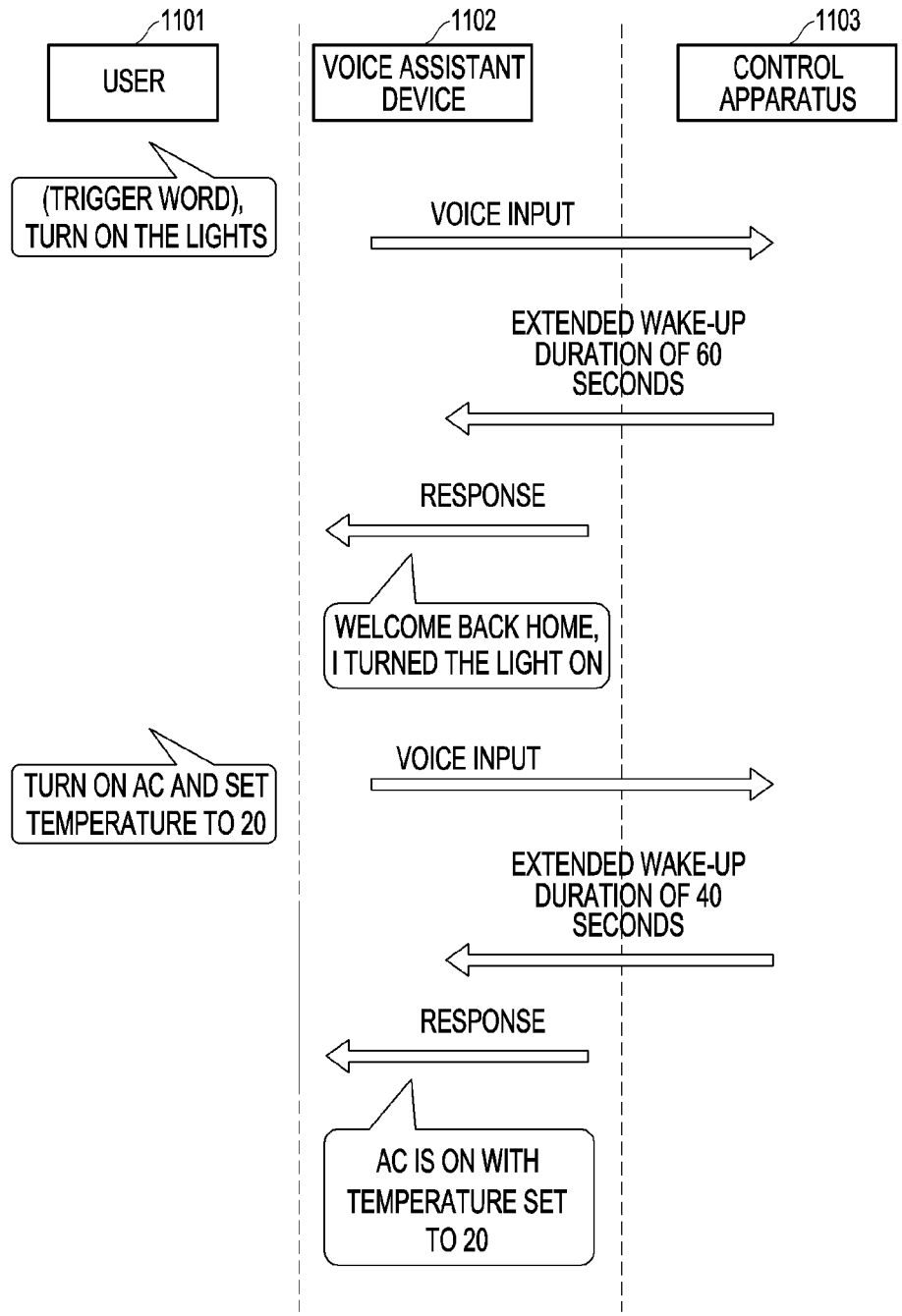

Consider an example embodiment as illustrated in FIG. 11B. Consider user has a habit of controlling home appliances as soon as he enters home from office in evening. The user 1101 initiates service of the voice assistant device 1102 by providing voice input "(TRIGGER WORD), TURN ON THE LIGHTS". The voice input is received by the voice assistant device 1102 and provided to the control apparatus 1103 and historic data includes to request further requests, probability of issuance of subsequent voice inputs may be determined to be higher and also, the extended wake up duration may be determined to be for a longer duration. For example, in such cases, the extended wake-up duration may be 60 seconds. The voice assistant device 1102 may turn ON the lights and using NLG, the response to the voice input may be provided as "WELCOME BACK HOME, I TURNED THE LIGHTS ON". Along with the response, the wake-up duration may also be extended to 60 seconds. As predicted, the user 1101 provides subsequent voice input as "TURN ON AC AND SET TEMPERATURE TO 20". The voice input is received by the voice assistant device 1102 and provided to the control apparatus 1103. Since historic data of the user 1101 indicates that several home appliances are controlled at evening, the probability may be high. Accordingly, the extended wake-up duration may be for longer duration but shorter than previous wake-up duration. For example, the extended wake-up duration in relation to subsequent voice input may be 40 seconds. The voice assistant device 1102 may turn AC ON and set temperature to 20. Further, using NLG, the response to the voice input may be provided as "AC IS ON WITH TEMPERATURE SET TO 20". Along with the response, the wake-up duration may also be extended to 40 seconds and further voice inputs from the user 1101 is awaited in span of 40 seconds. If no voice inputs are received within said 40 seconds, the voice assistant device 1102 may be configured to be in the sleep mode.

Figure 11C:
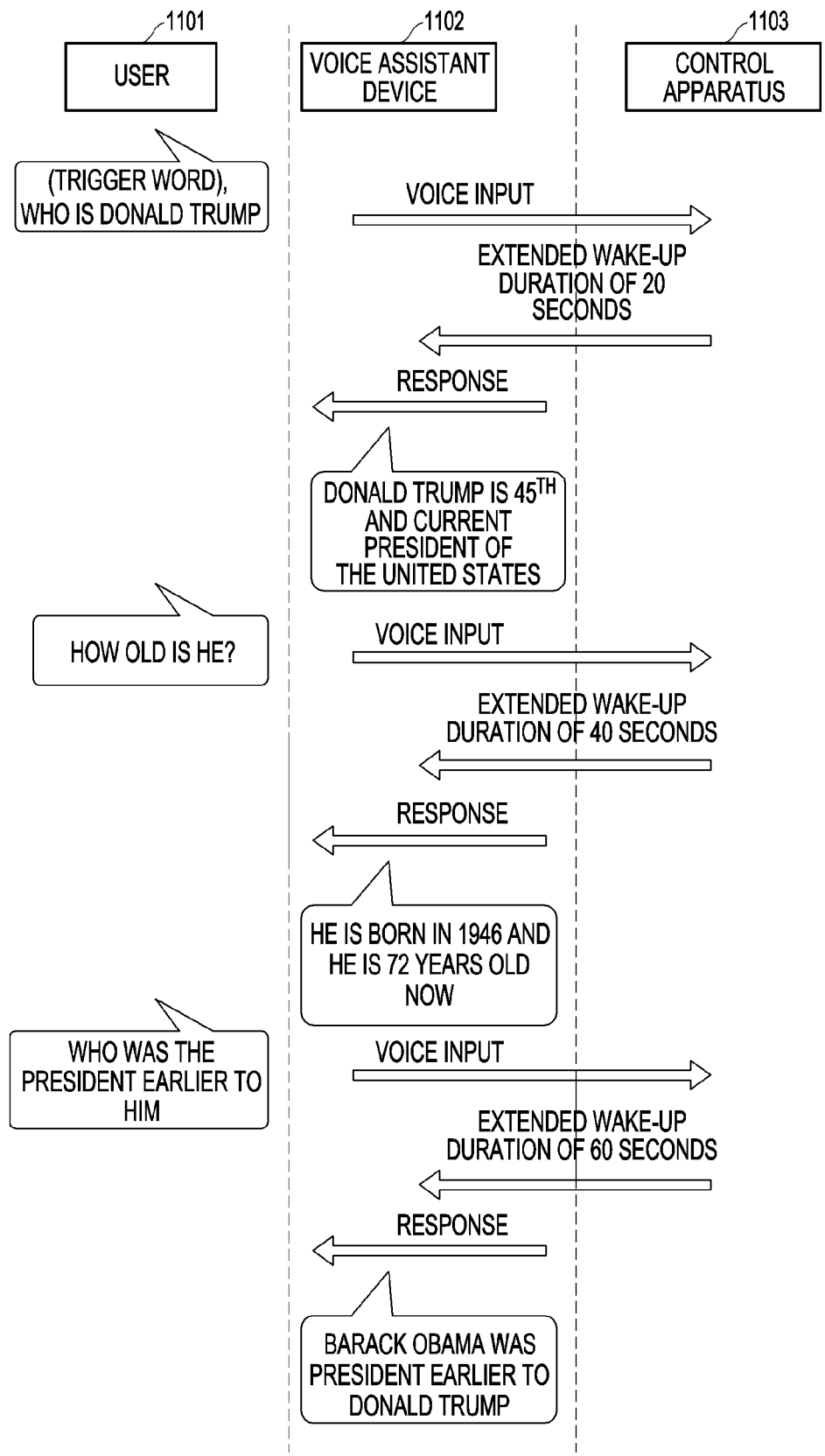

Consider an example embodiment as illustrated in FIG. 11C where the user 1101 is in deep conversation with the voice assistant device 1102. Deep conversation may include several questions, related to a single context, from the user 1101. The user 1101 initiates service of the voice assistant device 1102 by providing voice input "(TRIGGER WORD), WHO IS DONALD TRUMP". The voice input is received by the voice assistant device 1102 and provided to the control apparatus 1103. The voice input may be of new context with respect past requests to the user and hence, the determined probability may be of lower value. However if the user 1101 has previously indulged in deep conversations with the voice assistant devices 1102, the probability may be greater than the predefined threshold value. Therefore, the extended wake-up duration may be for shorter period of time. For example, in such cases, the extended wake-up duration may be 20 seconds. The voice assistant device 1102 may use NLG and provide the response to the voice input as "DONALD TRUMP IS 45TH AND CURRENT PRESIDENT OF THE UNITED STATES". Along with the response, the wake-up duration may also be extended to 20 seconds. The user 1101 provides subsequent voice input as "HOW OLD IS HE?" within 20 seconds duration. The voice input is received by the voice assistant device 1102 and provided to the control apparatus 1103. Since the subsequent voice input is related to previous voice input, the probability of receiving subsequent voice input may be determined to be high. Accordingly, the extended wake-up duration may be for longer duration than the previous wake-up mode duration. For example, the extended wake-up duration in relation to the subsequent voice input may be 40 seconds. Using NLG, the response to the voice input may be provided as "HE IS BORN IN 1946 AND HE IS 72 YEARS OLD". Along with the response, the wake-up duration may also be extended to 40 seconds and further voice inputs from the user 1101 is awaited in span of 40 seconds. If no voice inputs are received within said 40 seconds, the voice assistant device 1102 may be configured to be in the sleep mode. The user 1101 provides subsequent voice input as "WHO WAS THE PRESIDENT EARLIER TO HIM?" within 40 seconds duration. The voice input is received by the voice assistant device 1102 and provided to the control apparatus 1103. Again, since the subsequent voice input is related to previous voice inputs, the probability of receiving subsequent voice input may be determined to be high. Accordingly, the extended wake-up duration may be for longer duration than the previous wake-up mode durations. For example, the extended wake-up duration in relation to the subsequent voice input may be 60 seconds. Using NLG, the response to the voice input may be provided as "BARACK OBAMA WAS PRESIDENT EARLIER TO DONALD TRUMP". Along with the response, the wake-up duration may also be extended to 60 seconds and further voice inputs from the user 1101 is awaited in span of 60 seconds. If no voice inputs are received within said 60 seconds, the voice assistant device 1102 may be configured to be in the sleep mode.

Referring back to FIGS. 10A-10B, consider the user 1001 is indulged in continuous speech and provides a second command during the extended wake-up duration T1, in that case the continuous speech along with the second command is received by the voice assistant device 1002 and provided to the control apparatus 1003 and the probability determination apparatus 1004. When the probability determined for the second command is greater than the predefined threshold value, the extended wake-up duration T2 with respect to the second command is determined. Along with response to the second command, the wake-up mode of the voice assistant device 1002 is extended to the extended wake-up duration T2. Consider, further the user 1001 is indulged only in continuous speech without any command to the voice assistant device 1102. The continuous speech in the extended wake-up duration T2 is received. Based on the intent of the continuous speech, the probability with respect to the continuous speech may be determined. If the continuous speech is related to context of previous command, the probability may be higher than the predefined threshold value. If the continuous speech is not related to context of previous command, the probability may be lesser than the predefined threshold value. Consider the probability is greater than the predefined threshold value, the extended wake-up duration T3 with respect to the second command is determined. The wake-up mode of the voice 10 assistant device 1102 is extended to the extended wake-up duration T3.

Figure 11D:
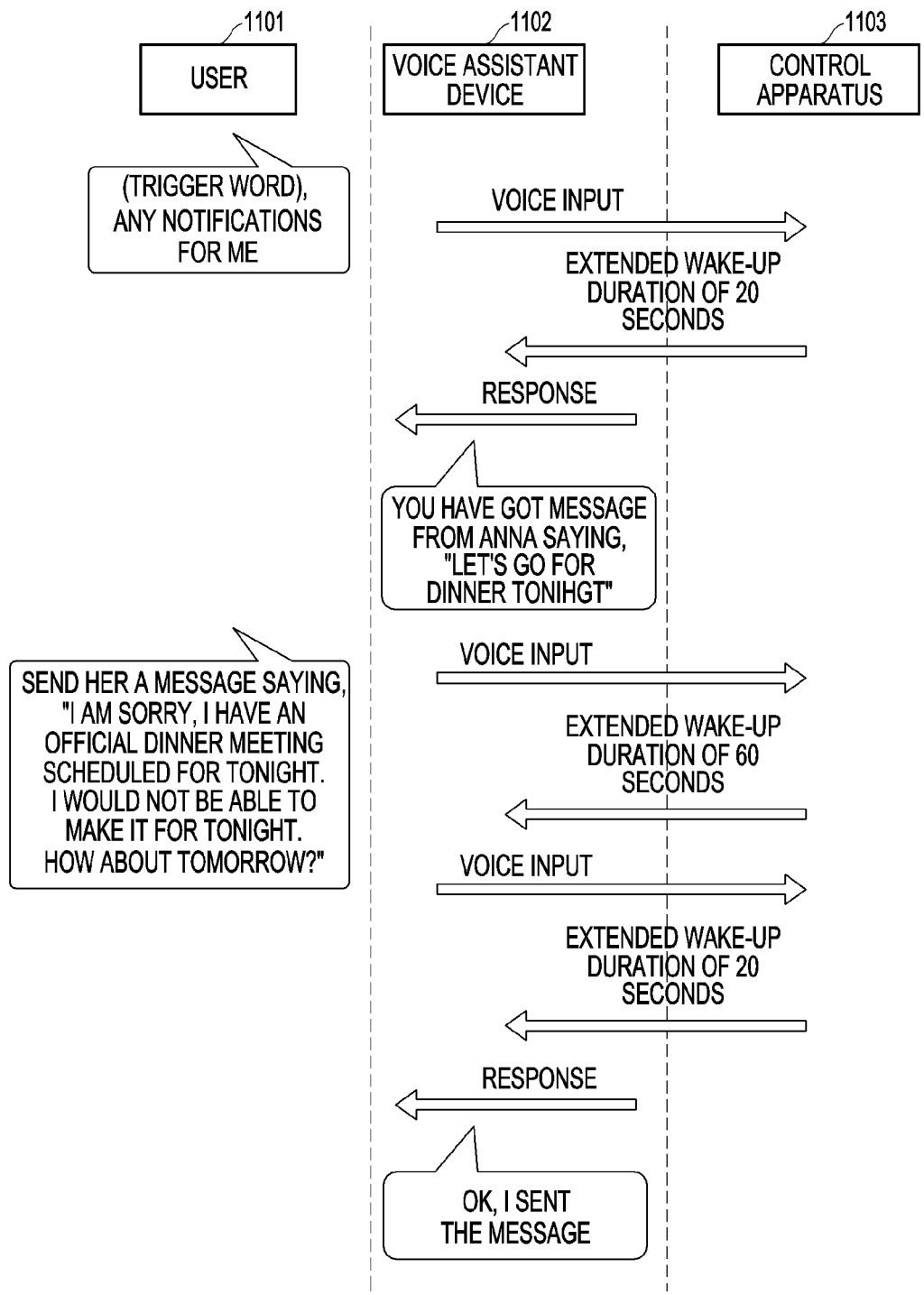

Consider an example embodiment as illustrated in FIG. 11D where the user 1101 initiates service of the voice assistant device 1102 by providing voice input "(TRIGGER WORD), ANY NOTIFICATION FOR ME". The voice input is received by the voice assistant device 1102 and provided to the control apparatus 1103. The voice input may be associated with onetime request and hence, the determined probability may be of lower value. Therefore, the extended wake-up duration may be for shorter period of time. For example, in such cases, the extended wake-up duration may be 20 seconds. The voice assistant device 1102 may use NLG and provide the response to the voice input as "YOU HAVE GOT MESSAGE FROM ANNA SAYING, "LET"S GO FOR DINNER TONIGHT". Along with the response, the wake-up duration may also be extended to 20 seconds. The user 1101 provides subsequent voice input as a continuous speech as "SEND HER A MESSAGING SAYING, "I AM SORRY, I HAVE AN OFFICIAL DINNER MEETING SCHEDULED FOR TONIGHT. I WOULD BOT BE ABLE TO MAKE IT FOR TONIGHT. HOW ABOUT TOMMOROW?". The voice input is a continuous speech lasts for more than 20 seconds. Also, since the subsequent voice input is related to previous voice input, the probability of receiving subsequent voice input may be determined to be high. Accordingly, the extended wake-up duration may be for longer duration than the previous wake-up mode duration. For example, the extended wake-up duration in relation to the subsequent voice input may be 60 seconds. However, if the voice input is still received from the user 1101, the control apparatus 1103 may be configured to further extend the wake-up mode duration of the voice assistant device 1102. Process of extending the wake-up mode duration may continue until the voice inputs is completed received and there is not voice input for predefined duration of time. For example, initially, the wake-up duration was extended to 60 seconds and further extended to 20 seconds. Upon completion of the extended wake-up duration, using NLG, the response to the voice input may be provided as "OK, I SENT THE MESSAGE". The voice assistant device 1102 may be configured to be in the sleep mode upon sending the response.

Figure 11E:
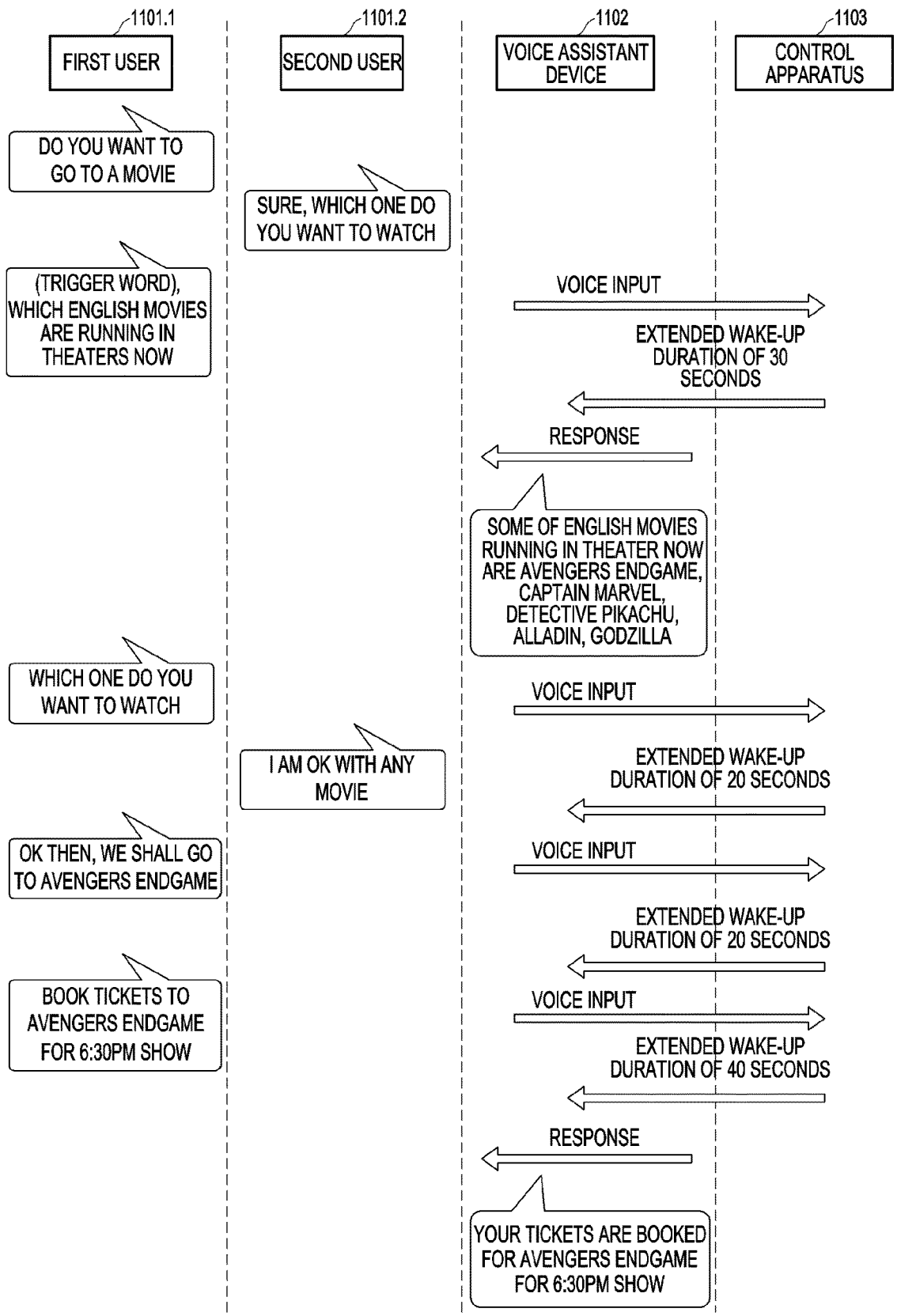

Consider an example embodiment as illustrated in FIG. 11E where first user 1101.1 and second user 1101.2 are indulged in a conversation. The first user 1101.1 may converse with the second user 1101.2 saying "DO YOU WANT TO GO TO A MOVIE". The second user 1101.2 may reply saying "SURE WHICH ONE DO YOU WANT TO WATCH". Since, none of the first user 1101.1 and the second user 1101.2 have said trigger word, the voice assistant device 1102 may still be the sleep-mode. Further, the first user 1101.1 initiates service of the voice assistant device 1102 by saying "(TRIGGER WORD), WHICH ENGLISH ARE RUNNING IN THEATRES NOW". The voice input is received by the voice assistant device 1102 and provided to the control apparatus 1103. The probability of the voice input may be determined to be greater than the predefined threshold value and the extended wake-up duration may be determined to be 30 seconds. The voice assistant device 1102 may use NLG and provide the response to the voice input as "SOME OF ENGLISH MOVIES RUNNING IN THEATRE NOW ARE AVENGERS:ENDGAME, CAPTIAN MARVEL, DETECTIVE RIKACHU, ALLADIN, GODZILLA". Along with the response, the wake-up duration may also be extended to 30 seconds. Upon hearing to the response, the first user 1101.1 indulges in a conversation with the second user 1101.2 saying, "WHICH ONE DO YOU WANT TO WATCH". The second user 1101.2 may reply to the first user 1101.1 saying, "I AM OK WITH ANY MOVIE". For which, the first user 1101.1 replies saying, "OK THEN, WE SHALL GO TO AVENGERS:ENDGAME". During the conversation between the first user 1101.1 and the second user 1101.2, the voice assistant device 1102 may be configured to receive voice inputs from the first user 1101.1 and the second user 1101.2 and provide the voice inputs to the control apparatus 1103. During the conversation, since each of the voice inputs are relevant to initial request from the first user 1101.1, the control apparatus 1103 the probability to be greater than the predefined threshold value. Also, the wake-up duration of the voice assistant device 1102 may be increased until further request is received to the voice assistant device 1102. For example, as shown in the figure, the wake-up mode may be extended, initially, to 20 seconds, further to 20 seconds and 40 seconds. When the first user 1101.1 says "BOOK TICKETS TO AVENGERS"ENDGAME FOR 6:30 PM SHOW", the voice assistant device 1102 may detect the voice input to be a request and accordingly respond. The voice assistant device 1102 may book tickets and using NLG, may response, saying, "YOUR TICKETS ARE BOOKED FOR AVENGERS:ENDGAME FOR 6:30 PM SHOW". Since the task is completed, the voice assistant device 1102 may be configured to be in the sleep mode upon sending the response.

Referring back to FIGS. 10A-10B, consider the user 1001 is indulged in continuous speech and provides a third command during the extended wake-up duration T1. In that case, the continuous speech along with the second command is received by the voice assistant device 1002 and provided to the control apparatus 1003 and the probability determination apparatus 1004. When the probability determined for the second command is lesser than the predefined threshold value, the extended wake-up duration may be determined to be zero. Along with response to the second command, the voice assistant device 1002 may be configured to operate in the sleep-mode.

Figure 11F:
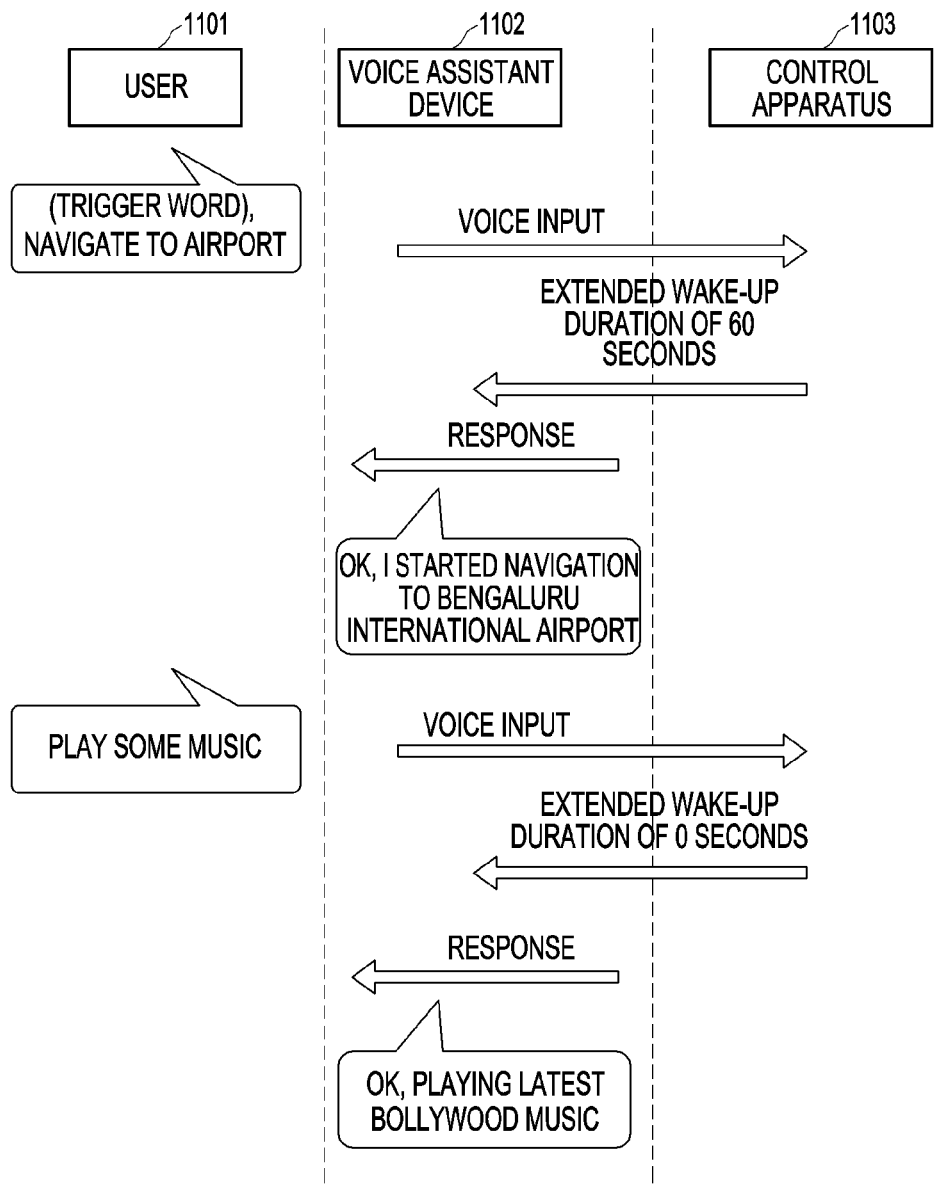

Consider an example embodiment as illustrated in FIG. 11F. Consider the user 1101 has a habit of playing music using the voice assistant device 1102 in a vehicle, as soon as he gets into the vehicle. The user 1101 initiates service of the voice assistant device 1102 by providing voice input "(TRIGGER WORD), NAVIGATE TO AIRPORT". The voice input is received by the voice assistant device 1102 and provided to the control apparatus 1103. Since, request for music is still not received, the probability of issuance of subsequent voice inputs may be determined to be higher and also, the extended wake up duration may be determined to be for a longer duration. For example, in such cases, the extended wake-up duration may be 60 seconds. The voice assistant device 1102 may provide navigation to the airport and using NLG, the response to the voice input may be provided as "OK, I STARTED NAVIGATION TO BENGALURU INTERNATIONAL AIRPORT". Along with the response, the wake-up duration may also be extended to 60 seconds. As predicted, the user 1101 provides subsequent voice input as "PLAY SOME MUSIC". The voice input is received by the voice assistant device 1102 and provided to the control apparatus 1103. Since the expected request is already received, the probability may be determined to be lesser than the predefined threshold value. Hence, the extended wake-up duration may be determined to be zero.

Using the NLG, the response may be provided as "OK, PLAYING LATEST BOLLYWOOD MUSIC". Also, the voice assistant device 1102 may be configured to be in the sleep mode.

Figure 12A:
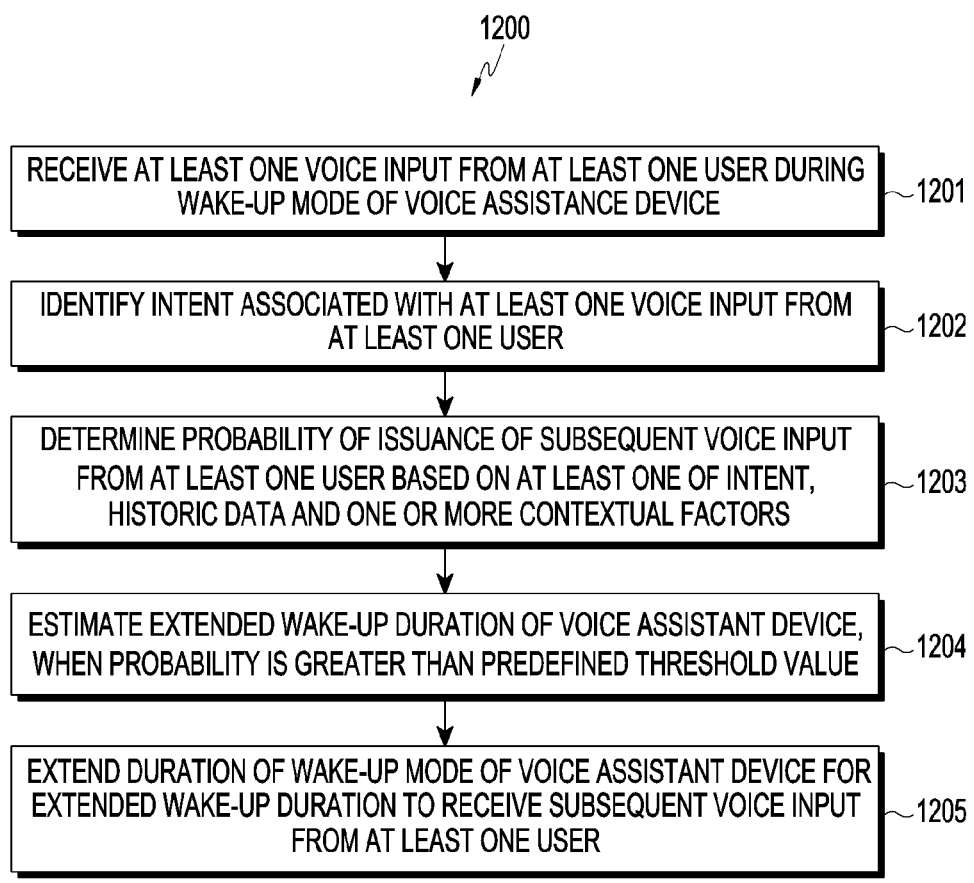
FIG. 12A shows a flow diagram illustrating method for controlling a voice assistant device, according to embodiments as disclosed herein.

FIG. 12A illustrates a flowchart showing an example method 1200 of the voice assistant device 701.

At block 1201, the voice assistant device 701 may be configured to receive the at least one voice input from at least one user 702 during the wake-up mode of the voice assistance device. In an embodiment, the at least one voice input may be dynamically received from the voice assistant device 701.

At block 1202, the voice assistant device 701 may be configured to identify intent associated with the at least one voice input from the at least one user 702. In an embodiment, conversation knowledge of previous voice inputs from the at least one user 702 may be used to identify the intent.

Figure 12B:
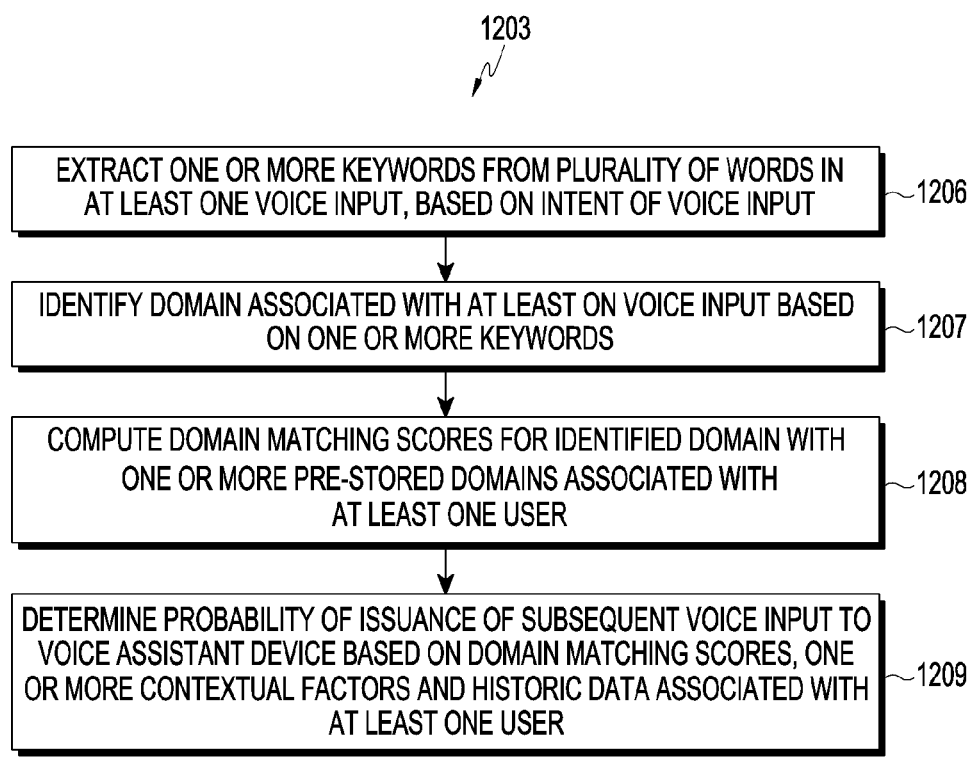
FIG. 12B shows a flow diagram illustrating method for determining probability of issuance of a subsequent voice input to a voice assistant device, in accordance with some embodiments of present disclosure.

At block 1203, the voice assistant device 701 determines the probability of issuance of subsequent voice inputs. The probability of issuance of the subsequent voice input may be determined based on the intent, the historic data and the one or more contextual factors. FIG. 12b illustrates a flowchart showing an example method 1203 for determining the probability of issuance of the subsequent voice input, in accordance with some embodiments of present disclosure.

At block 1206, the voice assistant device 701 may be configured to extract one or more keywords from the plurality of words in the at least one voice input, based on the intent of the voice input. For extracting the one or more keywords, weightage is assigned to each of the plurality of words of the at least one voice input. Further, keywords in the plurality of words with weightage greater than a predefined weightage value are identified to be the one or more keywords.

At block 1207, the voice assistant device 701 may be configured to identify the domain associated with the at least one voice input based on the one or more keywords. One or more techniques, known to a person skilled in the art, may be implemented to identify the domain.

At block 1208, the voice assistant device 701 may be configured to compute the domain matching scores for the identified domain with the plurality of pre-stored domains associated with the at least one user 702. In an embodiment, the plurality of pre-stored domains may be identified based on previous voice inputs from the at least one user 702.

At block 1209, the voice assistant device 701 may be configured to determine the probability of issuance of the subsequent voice input to the voice assistant device 701, based on the domain matching scores, the one or more contextual factors and the historic data associated with the at least one user 702.

Referring back to FIG. 12A, at block 1204, when the probability is greater than a predefined threshold value, the voice assistant device 701 may be configured to estimate the extended wake-up duration of the voice assistant device. In an embodiment, when the probability is lesser than the predefined threshold value, the extended wake-up duration may be determined to be zero.

At block 1205, the voice assistant device 701 may be configured to extend duration of the wake-up mode of the voice assistant device 701 for the extended wake-up duration to receive the subsequent voice input from the at least one user 702. When the probability is lesser than the predefined threshold value determining, the voice assistant device 701 may be configured to be in sleep-mode until a trigger to operate in the wake-up mode is detected.

Methods illustrated in FIGS. 12A-12B may include one or more blocks for executing processes in at least one of the voice assistant device 701, the control apparatus 709 and the probability determination apparatus 710. The methods illustrated in FIGS. 12A and 12B may be described in the general context of computer executable instructions. Generally, computer executable instructions can include routines, programs, objects, components, data structures, procedures, modules, and functions, which perform particular functions or implement particular abstract data types.

The order in which the methods illustrated in FIGS. 12A-12B are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Figure 13:
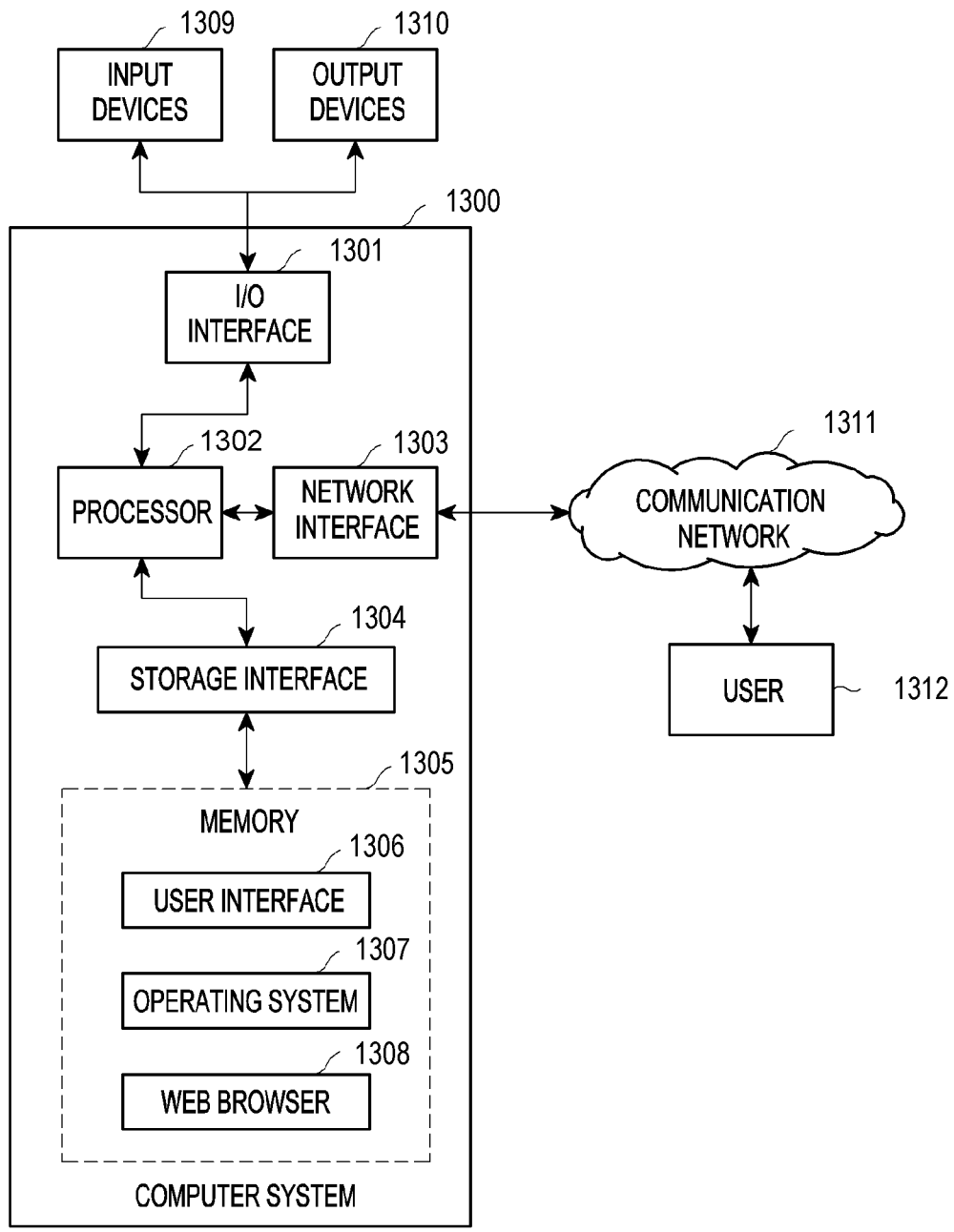
FIG. 13 illustrates a block diagram of an exemplary computer system for implementing embodiments as disclosed herein.

FIG. 13 illustrates a block diagram of an example computer system 1300 for implementing embodiments consistent with the present disclosure. In an embodiment, the computer system 1300 is used to implement at least one of the voice assistant device 701, the control apparatus 709 and the probability determination apparatus 710. The computer system 1300 may include a central processing unit ("CPU" or "processor") 1302. The processor 1302 may include at least one data processor for executing processes in Virtual Storage Area Network. The processor 1302 may include specialized processing units such as, integrated system (bus) controllers, memory management control units, floating point units, graphics processing units, digital signal processing units, etc.

The processor 1302 may be disposed in communication with one or more input/output (I/O) devices 1309 and 1310 via I/O interface 1301. The I/O interface 1301 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1301, the computer system 1300 may communicate with one or more I/O devices 1309 and 1310. For example, the input devices 1309 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 1310 may be a printer, fax machine, video display (e.g., cathode ray tube (CRT), liquid crystal display (LCD), light-emitting diode (LED), plasma, Plasma Display Panel (PDP), Organic light-emitting diode display (OLED) or the like), audio speaker, etc.

In some embodiments, the computer system 1300 may consist of at least one of the voice assistant device 701, the control apparatus 709 and the probability determination apparatus 710. The processor 1302 may be disposed in communication with the communication network 1311 via a network interface 1303. The network interface 1303 may communicate with the communication network 1311. The network interface 1303 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1311 may include, without limitation, a direct interconnection, local area network (LAN), wide area network (WAN), wireless network (e.g., using Wireless Application Protocol), the Internet, etc. Using the network interface 1303 and the communication network 1311, the computer system 1300 may communicate with the user 1312 for providing service to the user 1312. The network interface 1303 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 1311 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 1302 may be disposed in communication with a memory 1305 (e.g., RAM, ROM, etc. not shown in FIG. 13) via a storage interface 1304. The storage interface 1304 may connect to memory 1305 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 1305 may store a collection of program or database components, including, without limitation, user interface 1306, an operating system 1307, web browser 1308 etc. In some embodiments, computer system 1300 may store user/application data 1306, such as, the data, variables, records, etc., as described in this disclosure. Such databases may be implemented as fault-tolerant, relational, scalable, secure databases such as Oracle® or Sybase®.

The operating system 1307 may facilitate resource management and operation of the computer system 1300. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 1300 may implement a web browser 1308 stored program component. The web browser 1308 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 1108 may utilize facilities such as AJAX, DHTML, Adobe Flash, JavaScript, Java, Application Programming Interfaces (APIs), etc. In some embodiments, the computer system 1300 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 1300 may implement a mail client stored program component. The mail client may be a mail viewing application, such as Apple Mail, Microsoft Entourage, Microsoft Outlook, Mozilla Thunderbird, etc.

An embodiment of the present disclosure is configured to provide best user experience by dynamically determining extension duration of wake-up mode of voice assistance device.

An embodiment of the present disclosure provides accurate probability of issuance of subsequent voice inputs, by considering intent of voice inputs, historic data and contextual factors associated with user.

The illustrated operations of FIGS. 12A-12B show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 14:
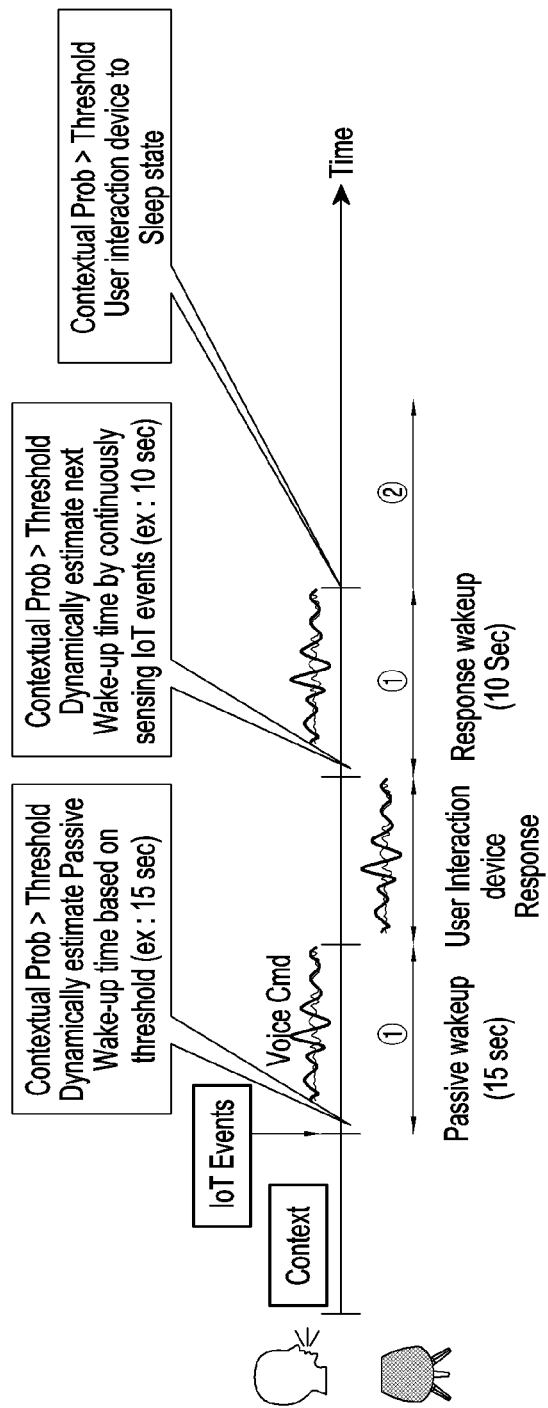
FIG. 14 illustrates an example scenario, wherein contextual probability based dynamic wakeup time can be configured to activate a user interaction device, according to embodiments as disclosed herein.

FIG. 14 depicts an example scenario, wherein contextual probability based dynamic wakeup time can be configured to activate the user interaction device 202, according to embodiments as disclosed herein. As illustrated in FIG. 14, the configuring device 204 estimates the dynamic wakeup time/passive wakeup time for activating the user interaction device 202 in the passive wakeup state. The passive wakeup time can be estimated based on the occurrence of the events with the devices 206 and the context parameters. The passive wakeup time may be directly proportional to the probability of user initiating the conversation with the user interaction device 202. In an example herein, the estimated passive wakeup time may be 15 seconds. For 15 seconds, the user interaction device 202 can be awake by entering into the passive wakeup state. During the passive wakeup state, the user interaction device 202 recognizes the queries (the voice commands) provided by the user 208 and provides the responses to the queries.

At the end of the estimated passive wakeup time (for example, 15 seconds), the configuring device 204 estimates a next wakeup time/response wakeup time by continuously sensing the occurrence of the events with the devices 206 and computing the contextual probability. In an example herein, the response wakeup time can be estimated as 10 secs. Further, at the end of 10 secs, the configuring device 204 determines that the contextual probability is lesser than the pre-defined threshold value and enables the user interaction device 202 to switch to the sleep state.

Figure 15:
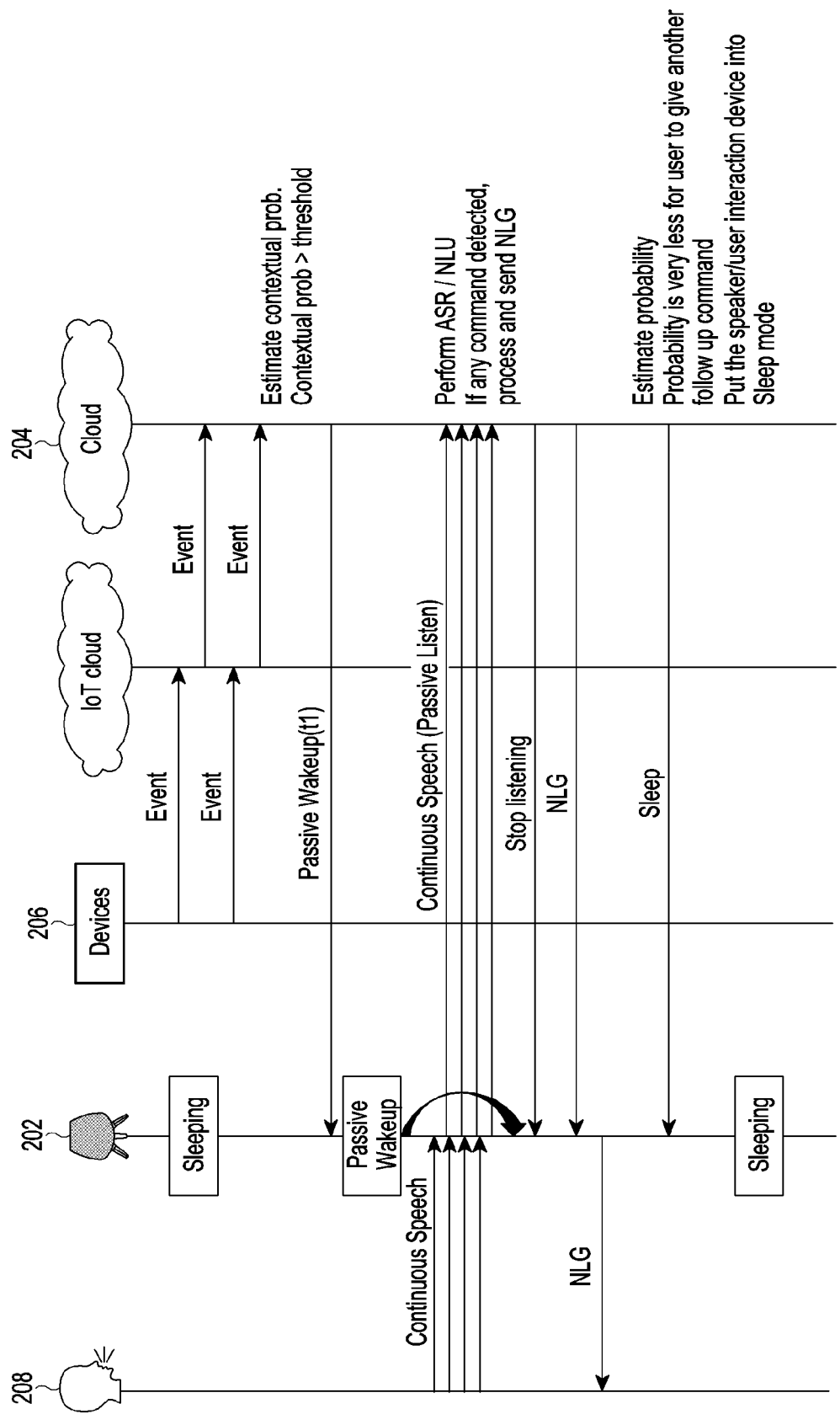
FIG. 15 is an example sequence diagram illustrating contextual probability based activation of a user interaction device, according to embodiments as disclosed herein.

FIG. 15 is an example sequence diagram illustrating contextual probability based activation of the user interaction device 202, according to embodiments as disclosed herein. Embodiments herein enable the devices 206 to continuously send the information to an IoT cloud. The IoT cloud may further communicate the information received from the devices 206 to the cloud 204/configuring device 204. Embodiments herein are further explained considering the cloud as an example of the configuring device 204, but it may be obvious to a person of ordinary skill in the art that other suitable devices can be considered. On receiving the information from the IoT cloud, the cloud 204 detects the occurrence of at least one event associated with the at least one device 206 present in the IoT environment. Once the event is detected, the cloud 204 estimates the contextual probability of initiating the conversation by the user with the user interaction device 202 based on the context parameters. On determining that the contextual probability is greater than or equal to the pre-defined threshold value, the cloud 204 sends the passive wakeup command to the user interaction device 202 for activation. The passive wakeup command includes the passive wakeup time duration which may be 'ti'. In an embodiment herein, the cloud 204 may send the passive wakeup command bundled along with the NLG to the user interaction device 202. On receiving the passive wakeup command, the user interaction device 202 switches to the passive wakeup state. In the passive wakeup state, the user interaction device 202 wakes up and continue to be in the same state for the passive wakeup time 'ti'. Further, the user interaction device 202 Thus, the user may initiate the user interaction device 202 without any trigger word.

The cloud 204 may recognize the voice commands (continuous speech) from the user 208 while the user interaction device 202 is in the passive wakeup state. The cloud 204 processes the voice commands by using at least one of an Automatic Speech Recognition (ASR) technique, a Natural Language Processing (NLP) technique and so on. Based on the processed voice commands, the cloud 204 may send the response wakeup time to the user interaction device 202 in the NLG form. The user interaction device 202 speaks out the NLG for the user and auto wakes up for the given response wakeup time duration.

Further, the cloud 204 may identify that the contextual probability is lesser than the pre-defined threshold value when the user stops providing the voice commands and incase of absence of occurrence of the events associated with the devices 206. On determining that the contextual probability is lesser than the pre-defined threshold value, the cloud 204 sends a sleep command to the user interaction device 202 to switch its state to the sleep state.

FIGS. 16A-16D depict example scenarios, wherein the user interaction device 202 can be activated according to the contextual probability based dynamic wakeup time, according to embodiments as disclosed herein.

Figure 16A:
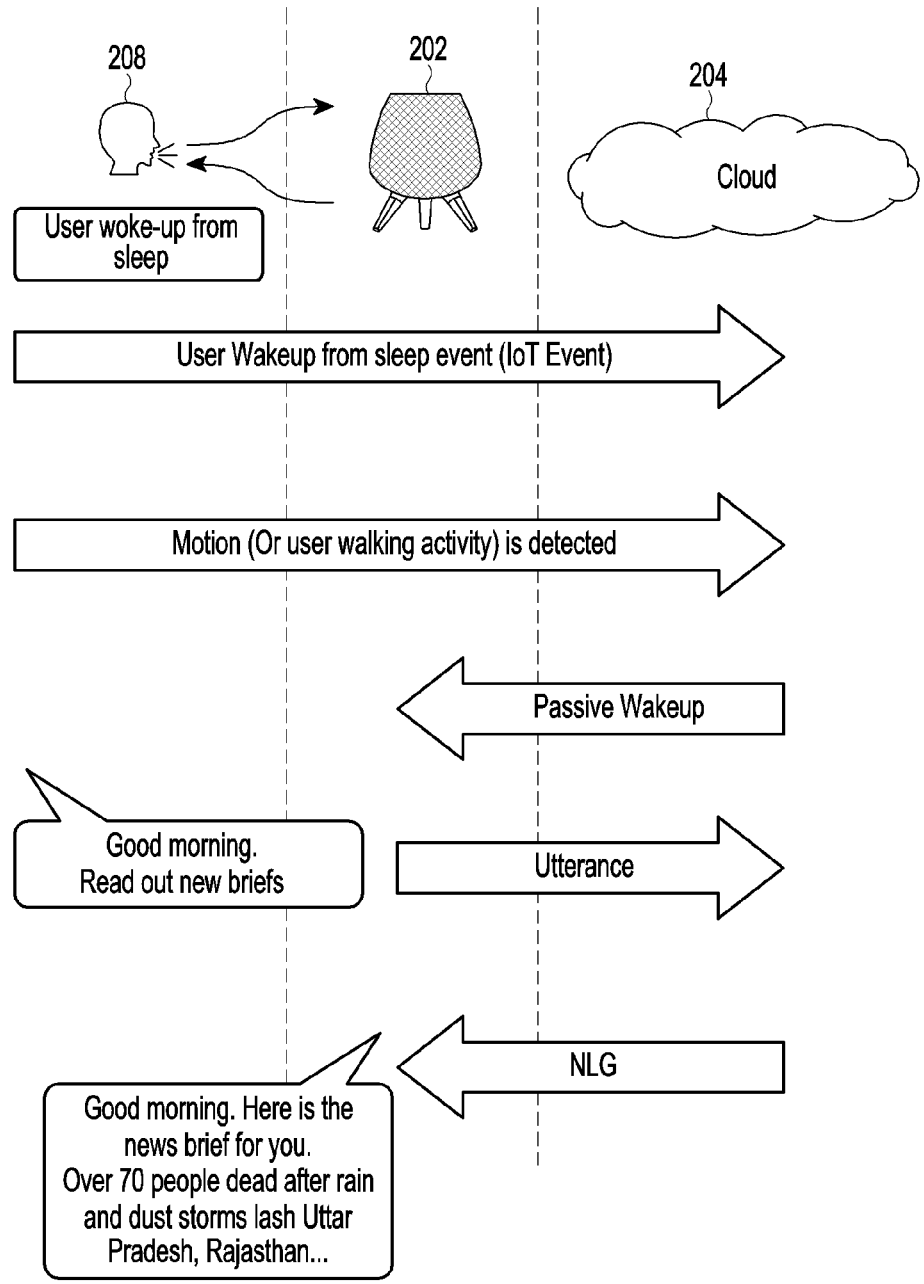
FIGS. 16A-16D illustrate example scenarios, wherein a user interaction device can be activated according to a contextual probability based dynamic wakeup time, according to embodiments as disclosed herein.

Consider a scenario, wherein the user 208 wakes up in the morning as illustrated in FIG. 16A. The cloud 204 (the configuring device 204) detects the user wakeup event as the first event by collecting the information from the wearable device of the user. The cloud 204 detects the user walking activity as the successive event. The user walking activity can be detected by collecting the information from the motion sensor. On determining the occurrence of the events, the cloud 204 estimates the contextual probability based on the context and the detected events. In an example herein, the context detected using the context parameters may indicate that the user 208 is sleeping at night. The contextual probability indicates the probability of initiating the conversation by the user 208 after wake up from the sleep. Based on the estimated contextual probability, the cloud 204 sends the passive wake up command to the user interaction device 202 indicating the passive wakeup time duration for which the user interaction device 202 needs to be awake.

Further, the user may say "Good morning, read out new briefs" without the trigger word after wakeup from the sleep. As the user interaction device 202 is in the passive wakeup state, the user device interaction device 202 provides the response to the user in the NLG form automatically.

Figure 16B:
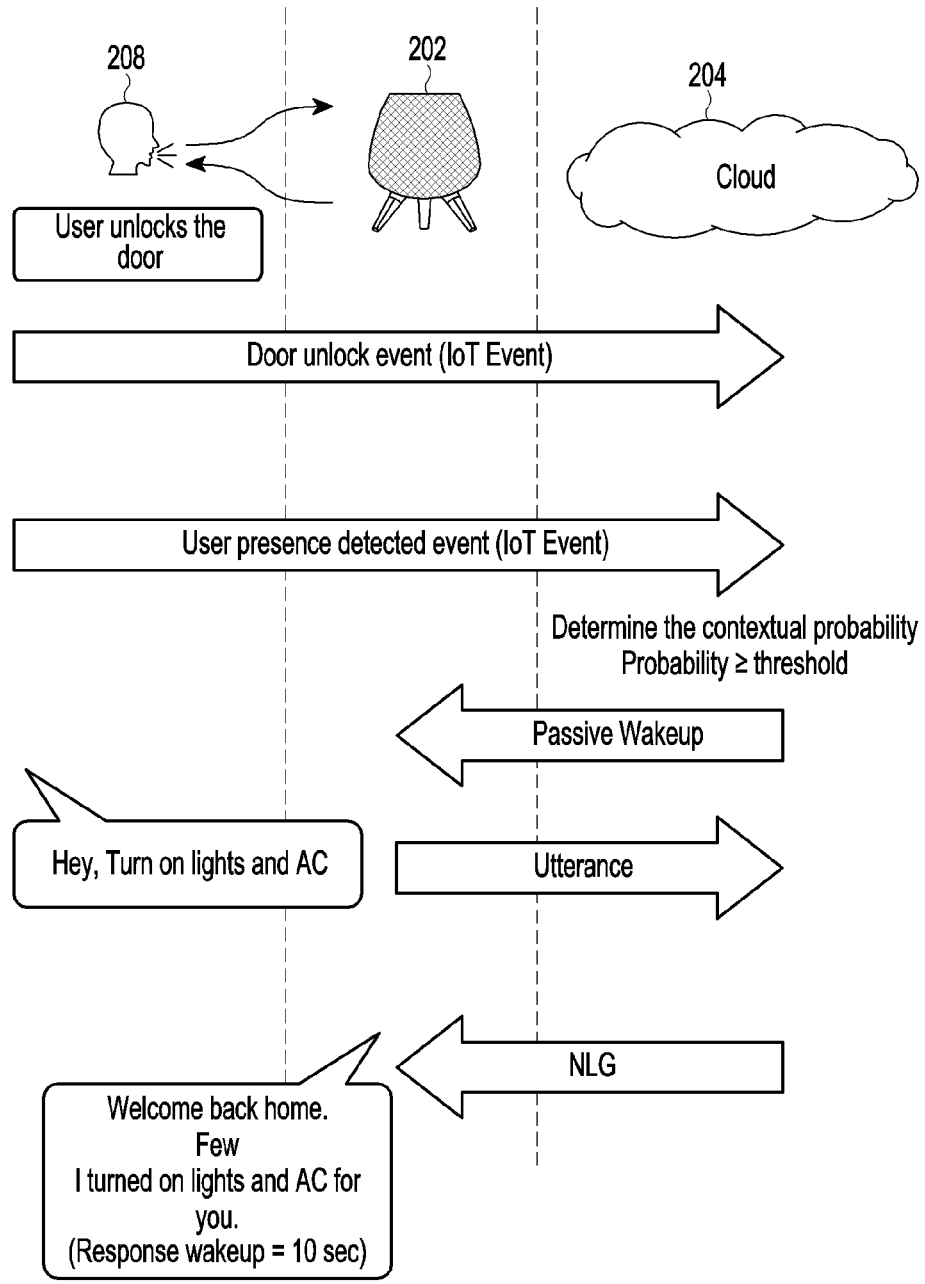

Consider a scenario, wherein the user 208 back to home after a busy schedule as illustrated in FIG. 16B. The cloud 204 detects a door unlock event as the first event. The door unlock event can be detected by collecting the information from the contact sensor present in the IoT environment. The cloud 204 also detects a user presence event as the successive event by collecting the information from the cameras present in the IoT environment. Based on the occurrence of the events, the cloud 204 estimates the contextual probability using the context parameters and the detected events. The context parameters may indicate the context as nobody is present at home and the user is expected to be back from office. The contextual probability indicates the probability of initiating the conversation by the user 208 after coming to the home. The cloud 204 configures the passive wakeup time duration for the user interaction device 202 based on the contextual probability. The passive wakeup time can be configured as 60 sec.

Further, the user 208 provides voice command "Turn ON lights and AC". On recognizing the voice command of the user, the user interaction device 202 performs the user command automatically without receiving any trigger word from the user 208 since the user interaction device 202 is in the passive wakeup state.

Figure 16C:
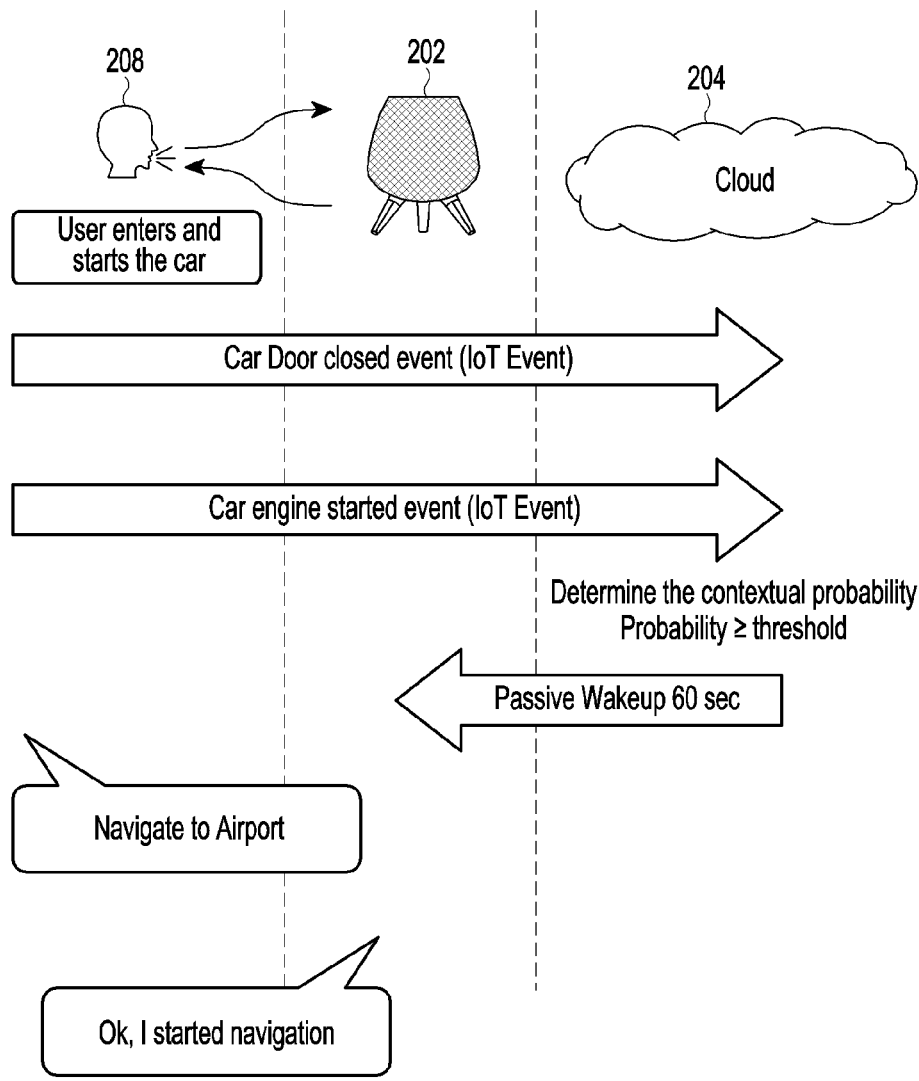

Consider a scenario, wherein the user 208 is in car as illustrated in FIG. 16C. The cloud 204 determines a car door closed event and a car engine started event by collecting the information from the devices 206. Once the events are detected, the cloud 204 identifies the context using the context parameters. The context can be identified, as the user is alone in the car and not involved in any conversation over voice/video call with any other person and not listening to music. Further, the cloud 204 realizes that if the user speaks out, then it's more probable that the user 208 may talk to the user interaction device 202. Based on the identified context, the cloud 204 determines the contextual probability and accordingly sends the passive wakeup command to the user interaction device 202 by indicating the passive wakeup time duration. In an example herein, the passive wakeup time can be configured as 60 sec. The user interaction device 202 continues to be in the wakeup state for 60 sec. Thus, when the user 208 starts driving or is in park mode, the user interaction device 202 switches to the passive wakeup state as probability of speaking is more. Further, the user may provide the voice command "navigate to airport" while the user interaction device 202 is in the passive wake up state. On recognizing the voice command, the user interaction device 202 provides the response to the user 208 without receiving any trigger word from the user 208.

Figure 16D:
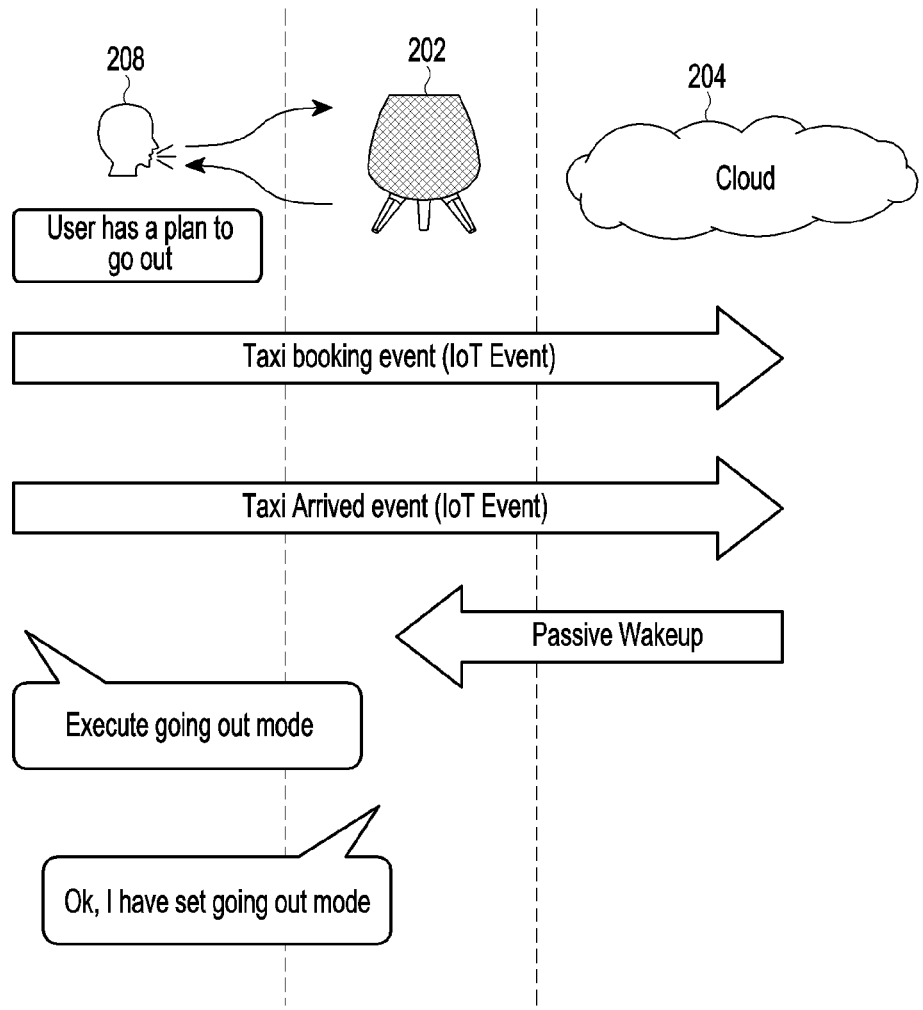

Consider a scenario, wherein the user 208 is hurry to go out of home as illustrated in FIG. 16D. The cloud 204 detects a taxi-booking event and a taxi arrived event by collecting information from the user's smart phone. The cloud 204 also uses the context parameters to identify the context. The context can be identified as TV, lights and AC are turned ON. Based on the identified context and the detected events, the cloud 204 determines the contextual probability and accordingly configures the passive wakeup time. The passive wakeup time may be sent to the user interaction device 202 in the passive wakeup command form. On receiving the passive wakeup command, the user interaction device 202 switches to the passive wakeup state. Further, the user 208 may provide voice command "execute going out mode". The user interaction device 202 executes the going out mode automatically without receiving any trigger word from the user 208.

Embodiments herein provide a great user experience by avoiding the tedious job of waking the user interaction device before talking to the user interaction device. Thus, saves the time of the user. Embodiments herein enable an easy and smooth conversation especially when the user is trying to make a fluid conversation with the user interaction device. Embodiments herein further provide a natural conversation experience, like talking to a person.

The embodiments disclosed herein can be implemented through at least one software program running on at least one hardware device and performing network management functions to control the elements. The elements shown in the figures can be at least one of a hardware device, or a combination of hardware device and software module.

The embodiments disclosed herein describe methods and systems for configuring a dynamic wakeup time for a user interaction device. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. A method for passive wakeup of a user interaction device by configuring a wakeup time of the user interaction device, the method comprising:
   detecting, by a configuring device, an occurrence of at least one non-voice event associated with at least one device present in an Internet of Things (IoT) environment, wherein the at least one device is connected to the configuring device;
   in response to detecting the occurrence of the at least one non-voice event, estimating, by the configuring device based on the detected at least one non-voice event, a probability of at least one voice interaction with the user interaction device being initiated by a user at a future time; and
   configuring, by the configuring device, the wakeup time to switch the user interaction device to a wakeup state in which the user interaction device is awake for the configured wake time, based on determining that the probability is above a pre-defined threshold value,
   wherein a duration of the wakeup time is determined as proportional to the estimated probability of the at least one voice interaction with the user interaction device being initiated by the user at a future time.

2. The method of claim 1, further comprising switching, by the configuring device, the user interaction device to a sleep state based on determining that the probability is not above the pre-defined threshold value.

3. The method of claim 1, wherein the estimating of the probability includes:
   determining a context using at least one context parameter, wherein the at least one context parameter includes at least one of a user context, a user personal language modeling data, a device context, a history of voice command interactions of the user, or a history of a sequence of events associated with the at least one device;
   extracting meaningful patterns of sequence of events from the history of voice command interactions of the user and the history of the sequence of events;
   performing a correlation of the meaningful patterns of sequence of events with the voice command interactions of the user derived from the history; and
   predicting a confidence value based on the correlation, the at least one non-voice event and at least one successive event associated with the at least one device, wherein the confidence value indicates the probability of the at least one voice interaction with the user interaction device being initiated by the user at a future time.

4. The method of claim 1, wherein the configuring the wakeup time based on the probability includes:
   comparing the probability with the pre-defined threshold value, wherein the pre-defined threshold value is estimated based on a conversation frequency of the user with the user interaction device; and
   configuring the wakeup time based on determining that the probability is above a predefined threshold value, wherein the wakeup time is configured based on at least one of at least one successive event or a user context.

5. The method of claim 1, further comprising sending, by the configuring device, a passive wakeup command to the user interaction device for switching to the wakeup state, wherein the passive wakeup command includes information about the configured wakeup time.

6. A configuring device comprising:
   an event detection unit configured to:
      detect an occurrence of at least one non-voice event associated with at least one device present in an Internet of Things (IoT) environment, wherein the at least one device is connected to the configuring device;

a contextual probability estimation unit configured to:
  in response to detecting the occurrence of the at least one non-voice event, estimate, based on the at least one non-voice event, a probability of at least one voice interaction with a user interaction device being initiated by a user at a future time; and
a wakeup time configuring unit configured to:
  configure a wakeup time to switch the user interaction device to a wakeup state in which the user interaction device is awake for the configured wake time, based on determining that the probability is above a predefined threshold value,
  wherein a duration of the wakeup time is determined proportional to the estimated probability of the at least one voice interaction with the user interaction device being initiated by the user at a future time.

7. The configuring device of claim 6, wherein the wakeup time configuring unit is further configured to switch the user interaction device to a sleep state based on determining the probability is not above the pre-defined threshold value.

8. The configuring device of claim 6, wherein the contextual probability estimation unit is further configured to:
  determine a context using at least one context parameter, wherein at least one context parameter includes at least one of a user context, a user personal language modeling data, a device context, a history of voice command interactions of the user, or a history of a sequence of events associated with the at least one device;
  extract meaningful patterns of sequence of events from the history of voice command interactions of the user and the history of the sequence of events;
  perform a correlation of the meaningful patterns of sequence of events with the voice command interactions of the user derived from the history; and
  predict a confidence value based on the correlation, the at least one non-voice event and at least one successive event associated with the at least one device, wherein the confidence value indicates the probability of the at least one voice interaction with the user interaction device being initiated by the user at a future time.

9. The configuring device of claim 6, wherein the wakeup time configuring unit is further configured to:
  compare the probability with the pre-defined threshold value, wherein the pre-defined threshold value is estimated based on a conversation frequency of the user with the user interaction device; and
  configure the wakeup time based on determining that the probability is above a predefined threshold value, wherein the wakeup time is configured based on at least one of at least one successive event or a user context.

10. The configuring device of claim 6, wherein the wakeup time configuring unit is further configured to send a passive wakeup command to the user interaction device for switching to the wakeup state, wherein the passive wakeup command includes information about the configured wakeup time.

11. A voice assistant device, comprising:
  a receiver configured to receive at least one voice input from at least one user, when operated in a wake-up mode;
  a processor; and
  a memory communicatively coupled to the processor, wherein the memory stores processor-executable instructions, which, on execution, cause the processor to:
    identify intent associated with the at least one voice input from the user;
    in response to receiving the at least one voice input, determine a probability of issuance of a subsequent voice input from the at least one user based on the intent, historic data and one or more contextual factors;
    identify an extended wake-up duration of the voice assistant device, when the probability is greater than a predefined threshold value; and
    extend duration of the wake-up mode, for the extended wake-up duration to receive the subsequent voice input from the at least one user,
  wherein the extended wake-up duration is determined proportional to the determined probability of issuance of the subsequent voice input from the at least one user.

12. The voice assistant device as claimed in claim 11, wherein the predefined threshold value is determined by analysis of the historic data, through devices connected to the voice assistance device.

13. The voice assistant device as claimed in claim 11, further comprises the processor configured to:
  determine the probability to be lesser than a predefined threshold value; and
  configure to be operated in sleep-mode until a trigger to be operated in the wake-up mode is detected.

14. The voice assistant device as claimed in claim 11, wherein the intent associated with the at least one voice input is determined by performing Natural-Language Understanding (NLU) on the at least one voice input.

15. The voice assistant device as claimed in claim 11, wherein the one or more contextual factors comprises at least one of user related factors, time related factors data and environment related factors.

16. The voice assistant device as claimed in claim 11, wherein the processor is configured to determine the probability of issuance of the subsequent voice input by:
  extracting one or more keywords from plurality of words in the at least one voice input;
  identifying a domain associated with the at least one voice input based on the one or more keywords;
  computing domain matching scores for the identified domain with plurality of pre-stored domains associated with the user; and
  determining a probability of issuance of the subsequent voice input to the voice assistant device, based on the domain matching scores.

17. The voice assistant device as claimed in claim 16, wherein extraction of the one or more keywords is performed by:
  assigning weightage to each of the plurality of words of the at least one voice input; and
  identifying one or more keywords from the plurality of words, with weightage greater than a predefined weightage value, to be the one or more keywords.

18. The voice assistant device as claimed in claim 11, further comprises the processor configured to:
  build a conversation knowledge for the at least one voice input, based on one or more extracted keywords, wherein the conversion knowledge is used for identifying the intent of the subsequent voice input to the voice assistant device.

19. The voice assistant device as claimed in claim 11, further comprises the processor configured to:
  configure the voice assistant device to be in sleep-mode if absence of the subsequent voice input is detected during the extended wake-up duration.

20. The method of claim 1, wherein the wakeup time is configured based on the probability.

21. The method of claim 1, wherein the user interaction device and the configuring device are integrated together.

22. The configuring device of claim 6, wherein the wakeup time is configured based on the probability.

23. The configuring device of claim 6, wherein the user interaction device and the configuring device are integrated together.

* * * * *